(12) United States Patent
Kilian et al.

(10) Patent No.: US 7,689,660 B2
(45) Date of Patent: *Mar. 30, 2010

(54) APPLICATION SERVER ARCHITECTURE

(75) Inventors: Frank Kilian, Mannheim (DE); Hans-Christoph Rohland, St. Leon-Rot (DE)

(73) Assignee: SAP AG, Walldorf (DE)

( * ) Notice: Subject to any disclaimer, the term of this patent is extended or adjusted under 35 U.S.C. 154(b) by 1070 days.

This patent is subject to a terminal disclaimer.

(21) Appl. No.: 11/149,562

(22) Filed: Jun. 9, 2005

(65) Prior Publication Data

US 2006/0282509 A1 Dec. 14, 2006

(51) Int. Cl.
G06F 15/167 (2006.01)
G06F 7/00 (2006.01)

(52) U.S. Cl. .................... 709/213; 709/214; 707/9; 707/100; 707/102

(58) Field of Classification Search ............ 709/213, 709/214; 707/9, 100, 102
See application file for complete search history.

(56) References Cited

U.S. PATENT DOCUMENTS

| 5,553,242 | A |   | 9/1996 | Russell et al. |
|---|---|---|---|---|
| 5,566,302 | A |   | 10/1996 | Khalidi et al. |
| 5,590,328 | A |   | 12/1996 | Seno et al. |
| 5,617,570 | A | * | 4/1997 | Russell et al. ........ 719/312 |
| 5,961,584 | A |   | 10/1999 | Wolf |
| 5,974,566 | A |   | 10/1999 | Ault et al. |
| 6,115,712 | A |   | 9/2000 | Islam et al. |
| 6,115,721 | A |   | 9/2000 | Nagy |
| 6,167,423 | A |   | 12/2000 | Chopra et al. |
| 6,167,449 | A |   | 12/2000 | Arnold et al. |
| 6,199,179 | B1 |   | 3/2001 | Kauffman et al. |
| 6,336,170 | B1 |   | 1/2002 | Dean et al. |
| 6,356,529 | B1 |   | 3/2002 | Zarom |
| 6,385,643 | B1 |   | 5/2002 | Jacobs et al. |
| 6,385,653 | B1 |   | 5/2002 | Sitaraman et al. |
| 6,415,364 | B1 |   | 7/2002 | Bauman et al. |
| 6,502,148 | B1 |   | 12/2002 | Krum |
| 6,539,445 | B1 |   | 3/2003 | Krum |
| 6,601,112 | B1 |   | 7/2003 | O'Rourke et al. |

(Continued)

FOREIGN PATENT DOCUMENTS

EP          1027796          6/2004

(Continued)

OTHER PUBLICATIONS

Bortvedt Jerry; "Functional Specification for Object Caching Service for Java (OCS4J), 2.0"; retrieved from http://jcp.org/en/jsr/detail?id=107; Mar. 2001.*

(Continued)

*Primary Examiner*—Vivek Srivastava
*Assistant Examiner*—Lin Liu
(74) *Attorney, Agent, or Firm*—Blakely Sokoloff Taylor & Zafman, LLP

(57) ABSTRACT

Embodiments of the invention are generally directed to a system and method for an application server architecture having a common connection manager for at least two heterogeneous application server software suites. One of the software suites is a standards-based application server software suite having a plurality of worker nodes. In one embodiment, the plurality of worker nodes share code and data that is stored in a shared memory.

25 Claims, 13 Drawing Sheets

U.S. PATENT DOCUMENTS

| | | |
|---|---|---|
| 6,615,253 B1 | 9/2003 | Bowman-Amuah |
| 6,640,244 B1 | 10/2003 | Bowman-Amuah |
| 6,681,251 B1* | 1/2004 | Leymann et al. ............ 709/226 |
| 6,687,702 B2 | 2/2004 | Vaitheeswaran et al. |
| 6,728,748 B1 | 4/2004 | Mangipudi et al. |
| 6,760,911 B1 | 7/2004 | Ye |
| 6,772,409 B1 | 8/2004 | Chawla et al. |
| 6,799,202 B1* | 9/2004 | Hankinson et al. .......... 709/219 |
| 7,089,566 B1 | 8/2006 | Johnson |
| 7,111,300 B1 | 9/2006 | Salas et al. |
| 7,130,891 B2 | 10/2006 | Bernardin et al. |
| 7,149,741 B2 | 12/2006 | Burkey et al. |
| 7,177,823 B2 | 2/2007 | Lam et al. |
| 7,191,170 B2 | 3/2007 | Ganguly et al. |
| 7,302,423 B2 | 11/2007 | De Bellis |
| 7,305,495 B2 | 12/2007 | Carter |
| 7,333,974 B2 | 2/2008 | Patterson |
| 7,349,921 B2 | 3/2008 | Hirstius et al. |
| 7,395,338 B2 | 7/2008 | Fujinaga |
| 2001/0029520 A1 | 10/2001 | Miyazaki |
| 2002/0049767 A1 | 4/2002 | Bannett |
| 2002/0078060 A1 | 6/2002 | Garst et al. |
| 2002/0133805 A1 | 9/2002 | Pugh et al. |
| 2002/0174097 A1 | 11/2002 | Rusch et al. |
| 2002/0181307 A1 | 12/2002 | Fifield et al. |
| 2002/0198923 A1 | 12/2002 | Hayes |
| 2003/0014521 A1 | 1/2003 | Elson et al. |
| 2003/0014552 A1 | 1/2003 | Vaitheeswaran et al. |
| 2003/0037148 A1 | 2/2003 | Pedersen |
| 2003/0037178 A1 | 2/2003 | Vessey et al. |
| 2003/0065711 A1 | 4/2003 | Acharya et al. |
| 2003/0084248 A1 | 5/2003 | Gaither et al. |
| 2003/0097360 A1 | 5/2003 | McGuire et al. |
| 2003/0105887 A1 | 6/2003 | Cox et al. |
| 2003/0115190 A1 | 6/2003 | Soderstrom et al. |
| 2003/0120811 A1 | 6/2003 | Hanson et al. |
| 2003/0177382 A1 | 9/2003 | Ofek et al. |
| 2003/0187927 A1 | 10/2003 | Winchell |
| 2003/0196136 A1 | 10/2003 | Haynes et al. |
| 2003/0200526 A1 | 10/2003 | Arcand |
| 2003/0208563 A1 | 11/2003 | Acree et al. |
| 2003/0212654 A1 | 11/2003 | Harper et al. |
| 2004/0024610 A1 | 2/2004 | Fradkov et al. |
| 2004/0024971 A1 | 2/2004 | Bogin et al. |
| 2004/0045014 A1 | 3/2004 | Radhakrishnan |
| 2004/0167980 A1 | 8/2004 | Doyle et al. |
| 2004/0181537 A1 | 9/2004 | Chawla et al. |
| 2004/0187140 A1 | 9/2004 | Aigner et al. |
| 2004/0213172 A1* | 10/2004 | Myers et al. ................ 370/313 |
| 2004/0221285 A1 | 11/2004 | Donovan et al. |
| 2004/0221294 A1 | 11/2004 | Kalmuk et al. |
| 2004/0243709 A1 | 12/2004 | Kalyanavarathan et al. |
| 2005/0021594 A1 | 1/2005 | Bernardin et al. |
| 2005/0044197 A1 | 2/2005 | Lai |
| 2005/0071459 A1 | 3/2005 | Costa-Requena et al. |
| 2005/0086237 A1 | 4/2005 | Monnie et al. |
| 2005/0086662 A1* | 4/2005 | Monnie et al. .............. 719/310 |
| 2005/0091388 A1 | 4/2005 | Kamboh et al. |
| 2005/0125503 A1 | 6/2005 | Iyengar et al. |
| 2005/0138193 A1 | 6/2005 | Encamacion et al. |
| 2005/0160396 A1 | 7/2005 | Chadzynski |
| 2005/0180429 A1 | 8/2005 | Ghahremani et al. |
| 2005/0188068 A1 | 8/2005 | Kilian |
| 2005/0198199 A1 | 9/2005 | Dowling |
| 2005/0246717 A1 | 11/2005 | Poole et al. |
| 2005/0256880 A1 | 11/2005 | Nam Koong et al. |
| 2005/0262181 A1 | 11/2005 | Schmidt et al. |
| 2005/0262493 A1 | 11/2005 | Schmidt et al. |
| 2005/0262512 A1 | 11/2005 | Schmidt et al. |
| 2005/0278346 A1 | 12/2005 | Shang et al. |
| 2006/0053112 A1 | 3/2006 | Chitkara et al. |
| 2006/0053425 A1 | 3/2006 | Berkman et al. |
| 2006/0059453 A1 | 3/2006 | Kuck et al. |
| 2006/0069712 A1 | 3/2006 | Anders et al. |
| 2006/0070051 A1 | 3/2006 | Kuck et al. |
| 2006/0094351 A1 | 5/2006 | Nowak et al. |
| 2006/0129512 A1 | 6/2006 | Braun et al. |
| 2006/0129546 A1 | 6/2006 | Braun et al. |
| 2006/0129981 A1 | 6/2006 | Dostert et al. |
| 2006/0130063 A1 | 6/2006 | Kilian et al. |
| 2006/0143328 A1 | 6/2006 | Fleischer et al. |
| 2006/0143608 A1 | 6/2006 | Dostert et al. |
| 2006/0143609 A1 | 6/2006 | Stanev |
| 2006/0143618 A1 | 6/2006 | Fleischer et al. |
| 2006/0143619 A1 | 6/2006 | Galchev et al. |
| 2006/0155867 A1 | 7/2006 | Kilian et al. |
| 2006/0206856 A1 | 9/2006 | Breeden et al. |
| 2006/0248283 A1 | 11/2006 | Galchev et al. |
| 2006/0253558 A1 | 11/2006 | Acree et al. |
| 2006/0282509 A1 | 12/2006 | Kilian et al. |
| 2006/0294253 A1 | 12/2006 | Linderman |
| 2007/0027877 A1 | 2/2007 | Droshev et al. |
| 2007/0050768 A1 | 3/2007 | Brown et al. |
| 2007/0055781 A1 | 3/2007 | Fleischer et al. |
| 2007/0150586 A1 | 6/2007 | Kilian et al. |
| 2007/0156869 A1 | 7/2007 | Galchev et al. |
| 2007/0156907 A1 | 7/2007 | Galchev et al. |

FOREIGN PATENT DOCUMENTS

| | | |
|---|---|---|
| WO | WO-0023898 | 4/2000 |
| WO | WO-0142908 | 6/2001 |

OTHER PUBLICATIONS

""SAP Web Application Server Security Guide"", *Version 1.00*, (Apr. 29, 2004), pp. 79-81, 89.

"Failover for Clustered RMI-P4 Remote Objects", http://help.sap.com/saphelp_nw04/helpdata/en/f6/4ef11ab3a52f408aa8a133f33d6cf1/cont (Nov. 2004), 1-3.

"Failover for Enterprise Beans" *SAP Library*, http://help.sap.com/saphelp_nw04/helpdata/en/8f/d6e45953a494499ea1b79ab16321d2/cont (Nov. 2004), 1-3.

"Failover System" *SAP Library*, http://help.sap.com/saphelp_nw04/helpdata/en/d7/57af0cce55143be5de3a6e4911186.cont. (Nov. 2004), 2 pages.

"High Availability and Failover" *SAP Library*, http://help.sap.com/saphelp_nw04/helpdata/en/6c/209da105668c45be12f1d9cc412e2b/cont (Nov. 2004), 1-2.

"Http Sessions and Failover of Web Application" *SAP Library*, http://help.sap.com/saphelp_nw04/helpdata.en.90/044cc585eaba42b649f16181b0fdf/cont., (Nov. 2004), 1.

"Java Technology in SAP Web Application Server" *SAP Library*, http://help.sap.com/saphelp_nw04/helpdata/en/0d/a3bbeff62847ae10000000a114084/cont (Nov. 2004), 1-3.

"Load Balancing of the SAP Web As for Java Applications" *SAP Library*, http://help.sap.com/saphelp_nw04/helpdata/en/b5/e8239ef7bd494f896a84625d4b688f/cont. (Nov. 2004), 2 pages.

"Marshalling Your Data", Sun.Com. http://java.sun.com/xml/jaxp/dist/1.0.1/docs/binding/Bindings2Marshall.html, pp. 1.

"RMI Clients on SAP NetWeaver", *SAP Platform Ecosystem*, (2005), Whole Document.

"SAP Beefs Up Java Support Capabilities For New NetWeaver" *News Story*, (Computerworld). http:..www.computerworld.com/printthis/2004/0,4814,96558,00.html, (Oct. 11, 2004), 1-2.

"SAP NetWever Makes Standard Java Robust" http://www.sap.com/company/press/press/epx?pageview=print&pressid=3069 (Oct. 5, 2004), 1-2.

"SAP Presents New Capabilities for NetWeaver" *InfoWorld* http://www.infoworld.com/article/04/10/06/HNsapnetweaver_1.html, (Oct. 6, 2004), 1-5.

"System and Method for Shared Memory/File System Java ObjectGroup Clustered JVM" http://priorartdatabase.com/IPCON000021597/, *Published* (Jan. 2004), 3.

"WebLogic RMI Features and Guidelines" *eDocs*, http://e-docs.bea.com/wls/docs90/rmi/rmi_api.html, (Nov. 2004), 1-7.

Barker, et al., ""A load balancing framework for adaptive and asynchronous applications"", *Parallel and Distributed Systems, IEEE Transactions on* vol. 15, Issue 2, (Feb. 2004), pp. 183-192.

Barrett, Ryan, "P4 Protocol Specification", (Sep. 2001), 1-12.

Bryce, Ciaran, "Isolates: A New Approach to Multi-Programming in Java Platforms" *LogOn Technology Transfer*, Kronerg, Germany, *Experts' Corner*, (May 2004), 7.

Czajkowski, Grzegorz, et al., "A Multi-User Virtual Machine", Grzegorz Czajkowski "*A Multi-User Virtual Machine*", *Paper, Sun Microsystems Laboratories and S3 Lab*, Purdue University, West Lafayette, IN, 2003, 14 pages., (2003), 14.

Czajkowski, Grzegorz, "Multitasking Without Compromise: a Virtual Machine Evolution", *Paper, Sun Microsystems Laboratories*, (2001), 1-14.

Dillenbeger, D., et al., "Building a java Virtual Machine For Serve Applications: The Jvm On Os/390", *IBM Systems Journal*, vol. 39, No. 1, (2000), 194-210.

Doyle, Patrick, et al., "A Modular and Extensible JVM Infrastructure", *Paper, Edward S. Rogers Sr. Department of Electrical and Computer Engineering*, University of Toronto, Toronto, Ontario, Canada, (Jul. 2002), 14.

Dwarkadas, Sandhya, et al., "Cashmere-VLM: Remote Memory Paging for Software Distributed Shared Memory", *Paper, Compaq Cambridge Research Lab*, Cambridge, MA and *Department of Computer Science*, University of Rochester, Rochester, NY, (Apr. 1999), 7.

Ferguson, Renee B., "SAP Preps New NetWeaver Capabilities", eWeek.com, http://www.eweek.com/article2/0,1759,1668146,00.asp, (Oct. 7, 2004), 1-6.

Gontmakher, Alex, et al., "Characterizations for Java Memory Behavior", *Paper, Computer Science Department, Technion*, (1997), 5.

Jordan, Mick, et al., "Extending a J2EE Server with Dynamic and Flexible Resource Management", *Paper, Sun Microsystems, Inc, and School of Computer Science*, University of Warterloo, Waterloo, ON, Canada, (Oct. 2004), 20.

Jordan, Mick, et al., "Scaling J2EE Application Servers with the Multi-Tasking Virtual Machine", *Paper, Sun Microsystems, SMLI TR-2004-135*, Jun. 2004, pp. 1-19, *Paper, Sun Microsystems, SMLI TR-2004-135*, (Jun. 2004), 1-19.

Kaushik, Dutta, et al., "ReDAL: An Efficient and Practical Request Distribution Technique for the Application Layer", *Internet Article 11* Nov. 2005, Singapore Management University., 1-30.

Keahey, K., "A Brief Tutorial on CORBA", Keahey, K., *Â?A Brief Tutorial on CORBA,Â?* pp. 5, httpwww.cs.indiana.edu~kksiazektuto.html, pp. 5.

Kuck, Norbert, et al., SAP VM Container: Using Process Attachable Virtual Machines to Provide Isolation and Scalability For Large Servers *Article, SAP AG*, Walldorf, Germany, (2002), 1-2.

Loosco, Marcelo, et al., "A New Distributed Java Virtual Machine for Cluster Computing", *Notes in Computer Science, Springer-Verlag*, v. 2790, (2003), 1207-1215.

Movva, Sudhir, et al., "Transparent Clustered Database Failover Using JAVA", http://www.quest-pipelines.com/newsletter-v5/0604_A.html, (Apr. 2004), 11.

Parnas, Dagfinn, "SAP Virtual Machine Container", https://weblogs.sdn.sap.com/pub/wlg/940, (Oct. 23, 2004), 1-4.

Polk, Jennifer, et al., "Oracle Database Net Services Administrator's Guide 10g Release 1 (10.1)", URL: http://download-west.oracle.com/docs/cd/B19306_01/network.102/b14212.pdf>; Oct. 2005; *retrieved on* Apr. 26, 2007., reference No. XP002431369, (Oct. 2005), 1-29.

Rosenberg, David, "Bringing Java to the Enterprise: Oracle on its Java Server Strategy", *IEEE Internet Computing IEEE USA*, vol. 2, No. 2; *Database accession* No. 5902816, XP002431362; ISSN: 1089-7801, (Mar. 2, 1998), 52-59.

Surdeanu, et al., ""Design and performance analysis of a distributed Java Virtual Machine"", *Parallel and Distributed Systems, IEEE Transactions on* vol. 13, Issue 6, (Jun. 2002), pp. 611-627.

Tullman, Patrick, et al., "Janos: A Java-Oriented OS for Active Network Nodes", *Paper, Flux Research Group*, University of Utah, (Mar. 2001), 14.

Vandermeer, et al., "ReDAL: Request Distribution for the Application Layer", *Distributed Computing Systems*, 2005. Jun. 6, 2005, pp. 717-726.

Wolf, Martin, "Administration of the SAP Web Application Server", *Seminar System Modeling 2005 Hasso-Plattner-Institute for Software Systems Engineering*, (2005), Whole Document.

USPTO, "FOA Mailed Aug. 14, 2008 for U.S. Appl. No. 11/025,378", Whole Document.

USPTO, "FOA Mailed Aug. 22, 2007 for U.S. Appl. No. 11/025,378", Whole Document.

USPTO, "OA Mailed Jan. 21, 2009 for U.S. Appl. No. 11/025,378", Whole Document.

USPTO, "OA Mailed Apr. 19, 2007 for U.S. Appl. No. 11/025,378", Whole Document.

USPTO "OA Mailed Mar. 31, 2008 for U.S. Appl. No. 11/025,378", Whole Document.

USPTO Final Office Action for U.S. Appl. No. 11/221,243, Mailed Feb. 27, 2009, 15 pages.

USPTO Non-Final Office Action for U.S. Appl. No. 11/221,243, Mailed Sep. 2, 2008, 18 pages.

USPTO Non-Final Office Action for U.S. Appl. No. 11/024,924, Mailed Apr. 10, 2008, 16 pages.

USPTO Final Office Action for U.S. Appl. No. 11/024,924, Mailed Oct. 8, 2008, 9 pages.

USPTO Non-Final Office Action for U.S. Appl. No. 11/025,525, Mailed Feb. 19, 2009, 15 pages.

USPTO Final Office Action for U.S. Appl. No. 11/013,277, Mailed Aug. 7, 2008, 22 pages.

USPTO Non-Final Office Action for U.S. Appl. No. 11/013,277, Mailed Jan. 6, 2009, 22 pages.

USPTO "FOA Mailed Aug. 17, 2007 for U.S. Appl. No. 11/013,277", Whole Document.

USPTO "OA Mailed Jan. 7, 2008 for U.S. Appl. No. 11/013,277", Whole Document.

USPTO "OA Mailed Mar. 12, 2007 for U.S. Appl. No. 11/013,277", Whole Document.

USPTO Non-Final Office Action for U.S. Appl. No. 11/013,278, Mailed Dec. 23, 2008, 28 pages.

USPTO "FOA Mailed Aug. 13, 2008 for U.S. Appl. No. 11/013,278 Whole Document".

USPTO "FOA Mailed Aug. 17, 2007 for U.S. Appl. No. 11/013,278", Whole Document.

USPTO "OA Mailed Feb. 5, 2008 for U.S. Appl. No. 11/013,278", Whole Document.

USPTO "OA Mailed Mar. 16, 2007 for U.S. Appl. No. 11/013,278", Whole Document.

USPTO Non-Final Office Action for U.S. Appl. No. 11/012,803, Mailed Dec. 23, 2008, 22 pages.

USPTO Final Office Action for U.S. Appl. No. 11/012,803, Mailed Jul. 22, 2008, 22 pages.

USPTO "FOA Mailed Aug. 28, 2007 for U.S. Appl. No. 11/012,803", Whole Document.

USPTO "OA Mailed Jan. 24, 2008 for U.S. Appl. No. 11/012,803", Whole Document.

USPTO "OA Mailed Mar. 16, 2007 for U.S. Appl. No. 11/012,803", Whole Document.

USPTO, "FOA Mailed Mar. 18, 2008 for U.S. Appl. No. 11/185,199", Whole Document.

USPTO, "OA Mailed Sep. 18, 2007 for U.S. Appl. No. 11/185,199", Whole Document.

USPTO, OA Mailed Sep. 11, 2008 for U.S. Appl. No. 11/185,199, Whole Document.

USPTO "OA Mailed Sep. 18, 2007 for US Patent Application", Whole Document.

USPTO Non-Final Office Action for U.S. Appl. No. 11/322,596, Mailed Jan. 23, 2009, 12 pages.

USPTO Non-Final Office Action for U.S. Appl. No. 11/118,019 Mailed Nov. 13, 2008, 10 pages.

Final Office Action for U.S. Appl. No. 11/185,199 Mailed Mar. 19, 2009, 18 pages.

Office Action for U.S. Appl. No. 11/025,514, Mailed Apr. 3, 2009, 12 pages.

Non-Final Office Action for U.S. Appl. No. 11/024,924, Mailed Apr. 24, 2009, 15 pages.

Notice of Allowance for U.S. Appl. No. 11/012,803, Mailed Jun. 10, 2009, 25 pages.

Notice of Allowance for U.S. Appl. No. 11/013,278, Mailed Jun. 11, 2009, 25 pages.

Notice of Allowance for U.S. Appl. No. 11/013,277, dated Jun. 25, 2009; 24 pages.

Notice of Allowance for U.S. Appl. No. 11/025,378, Mailed Jul. 2, 2009, 12 pages.

Notice of Allowability for U.S. Appl. No. 11/012,803, Mailed Sep. 3, 2009, 12 Pages.

Final Office Action for U.S. Appl. No. 11/025,525, Mailed Sep. 14, 2009, 13 Pages.

* cited by examiner

APPLICATION SERVER ARCHITECTURE

FIELD OF INVENTION

The field of invention pertains generally to the software arts; and, more specifically to an application server architecture.

BACKGROUND

Even though standards-based application software (e.g., Java™ based application software) has the potential to offer true competition at the software supplier level, legacy proprietary software has proven reliability, functionality and integration into customer information systems (IS) infrastructures. Customers are therefore placing operational dependency on standards-based software technologies with caution. Not surprisingly, present day application software servers tend to include instances of both standard and proprietary software suites, and, often, "problems" emerge in the operation of the newer standards-based software, or interoperation and integration of the same with legacy software applications.

The prior art application server 100 depicted in FIGS. 1a,b provides a good example. FIG. 1a shows a prior art application server 100 having both an Advanced Business Application Programming™ (ABAP) legacy/proprietary software suite 103 and a Java 2 Platform, Enterprise Edition (J2EE™) standards-based software suite 104. A connection manager 102 routes requests (e.g., HyperText Transfer Protocol (HTTP) requests and HTTP with secure socket layer (HTTPS) requests) associated with "sessions" between server 100 and numerous clients (not shown in FIG. 1) conducted over a network 101. A "session" can be viewed as the back and forth communication over a network 101 between computing systems (e.g., a particular client and the server).

The back and forth communication typically involves a client ("client") sending a server 100 ("server") a "request" that the server 100 interprets into some action to be performed by the server 100. The server 100 then performs the action and if appropriate returns a "response" to the client (e.g., a result of the action). Often, a session will involve multiple, perhaps many, requests and responses. A single session through its multiple requests may invoke different application software programs.

For each client request that is received by the application server's connection manager 102, the connection manager 102 decides to which software suite 103, 104 the request is to be forwarded. If the request is to be forwarded to the proprietary software suite 103, notification of the request is sent to a proprietary dispatcher 105, and, the request itself is forwarded into a request/response shared memory 106. The proprietary dispatcher 105 acts as a load balancer that decides which one of multiple proprietary worker nodes $107_1$ through $107_L$ are to actually handle the request.

A worker node is a focal point for the performance of work. In the context of an application server that responds to client-server session requests, a worker node is a focal point for executing application software and/or issuing application software code for downloading to the client. The term "working process" generally means an operating system (OS) process that is used for the performance of work and is also understood to be a type of worker node. For convenience, the term "worker node" is used throughout the present discussion.

When the dispatcher 105 identifies a particular proprietary worker node for handling the aforementioned request, the request is transferred from the request/response shared memory 106 to the identified worker node. The identified worker node processes the request and writes the response to the request/response shared memory 106. The response is then transferred from the request/response shared memory 106 to the connection manager 102. The connection manager 102 sends the response to the client via network 101.

Note that the request/response shared memory 106 is a memory resource that each of worker nodes $107_1$ through $107_L$ has access to (as such, it is a "shared" memory resource). For any request written into the request/response shared memory 106 by the connection manager 102, the same request can be retrieved by any of worker nodes $107_1$ through $107_L$. Likewise, any of worker nodes $107_1$ through $107_L$ can write a response into the request/response shared memory 106 that can later be retrieved by the connection manager 102. Thus the request/response shared memory 106 provides for the efficient transfer of request/response data between the connection manager 102 and the multiple proprietary worker nodes $107_1$ through $107_L$.

If the request is to be forwarded to the standards-based software suite 104, notification of the request is sent to the dispatcher 108 that is associated with the standards based software suite 104. As observed in FIG. 1a, the standards-based software suite 104 is a Java based software suite (in particular, a J2EE suite) that includes multiple worker nodes $109_1$ through $109_N$.

A Java Virtual Machine is associated with each worker node for executing the worker node's abstract application software code. For each request, dispatcher 108 decides which one of the N worker nodes is best able to handle the request (e.g., through a load balancing algorithm). Because no shared memory structure exists within the standards-based software suite 104 for transferring client session information between the connection manager 102 and the worker nodes $109_1$ through $109_N$, separate internal connections have to be established to send both notification of the request and the request itself to the dispatcher 108 from connection manager 102 for each worker node. The dispatcher 108 then forwards each request to its proper worker node.

FIG. 1b shows a more detailed depiction of the J2EE worker nodes $109_1$ through $109_N$ of the prior art system of FIG. 1a. Note that each worker node has its own associated virtual machine, and, an extensive amount of concurrent application threads are being executed per virtual machine. Specifically, there are X concurrent application threads ($112_1$ through $112_X$) running on virtual machine 113; there are Y concurrent application threads ($212_1$ through $212_Y$) running on virtual machine 213; and, there are Z concurrent application threads ($N12_1$ through $N12_Z$) running on virtual machine N13; where, each of X, Y and Z is a large number.

A virtual machine, as is well understood in the art, is an abstract machine that converts (or "interprets") abstract code into code that is understandable to a particular type of a hardware platform (e.g., a particular type of processor). Because virtual machines operate at the instruction level they tend to have processor-like characteristics, and, therefore, can be viewed as having their own associated memory. The memory used by a functioning virtual machine is typically modeled as being local (or "private") to the virtual machine. Hence, FIG. 1b shows local memory 115, 215, . . . N15 allocated for each of virtual machines 113, 213, . . . N13 respectively.

Various problems exist with respect to the prior art application server 100 of FIG. 1a. For example, the establishment of connections between the connection manager and the J2EE dispatcher to process a client session adds overhead/inefficiency within the standards based software suite 104. In an addition, the cumulative memory footprint of worker nodes $109_1$ through $109_N$ limits the scalability of standards-based software suite 104. Moreover, the "crash" of a virtual machine is not an uncommon event. In the prior art standards suite 104 of FIG. 1a, requests that are submitted to a worker node for processing are entered into a queue built into the local memory of the virtual machine that is associated with the worker node. If the virtual machine crashes, its in-process as well as its locally queued requests will be lost. As such, potentially, if the requests for a significant number of sessions are queued into the local memory of a virtual machine (e.g., as a direct consequence of the virtual machine's concurrent execution of a significant number of threads), the crash of the virtual machine will cause a significant number of sessions to be "dropped" by the application server 100.

SUMMARY

Embodiments of the invention are generally directed to a system and method for an application server architecture. In an embodiment, the application server architecture includes a connection manager having an integrated dispatcher to perform dispatching for a standards-based software suite. The standards-based software suite includes a plurality of worker nodes. In one embodiment, the plurality of worker nodes share code and data that is stored in a shared memory. The shared memory may also support a common caching architecture for the plurality of worker nodes. In an embodiment, the shared memory reduces the memory footprint of the application server architecture.

FIGURES

The present invention is illustrated by way of example and not limitation in the figures of the accompanying drawings, in which like references indicate similar elements and in which:

FIG. 1b shows a more detailed depiction of the J2EE worker nodes of FIG. 1a;

DETAILED DESCRIPTION

1.0 Overview

Figure 2:
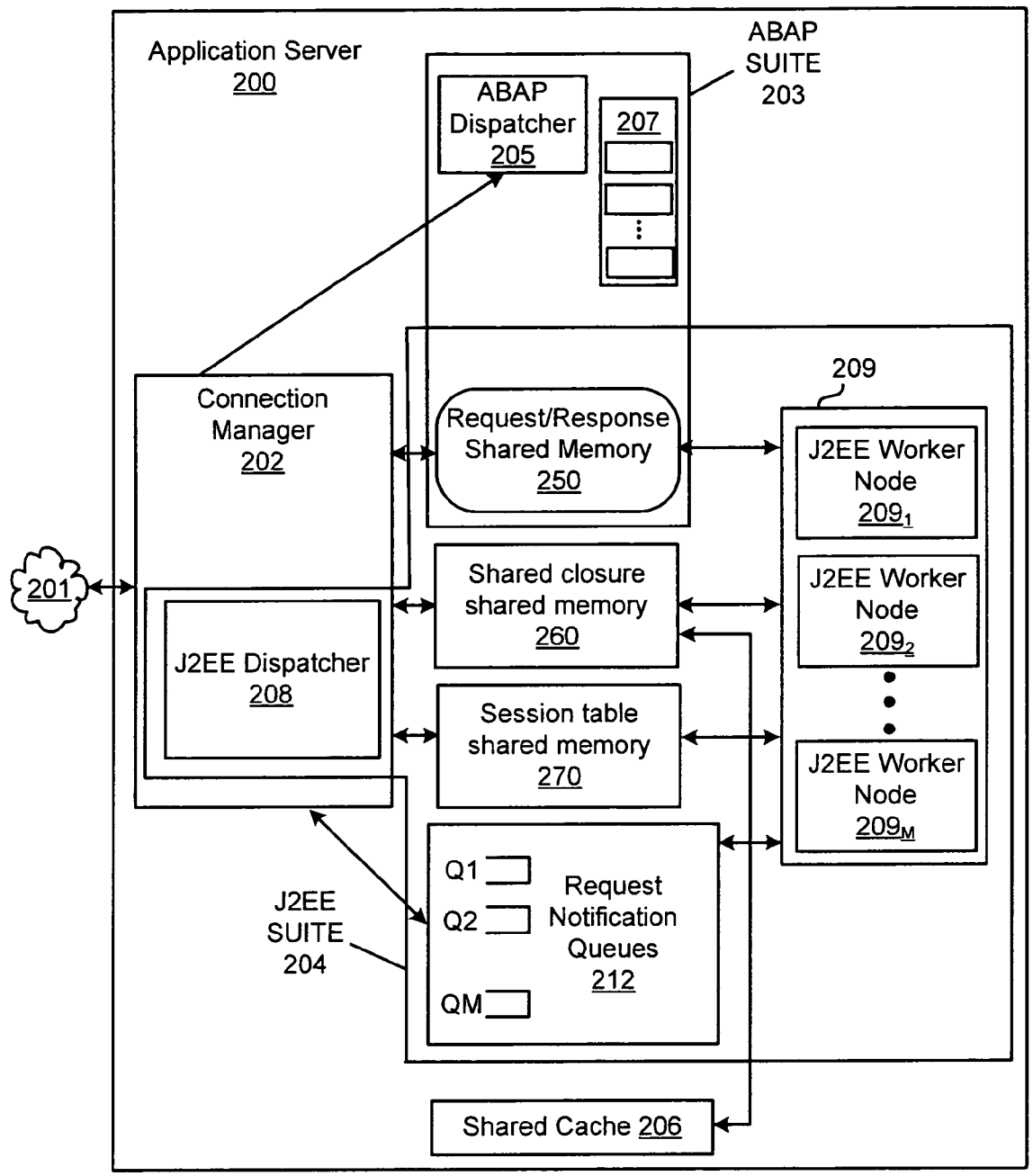
FIG. 2 shows an improved application server.

FIG. 2 shows the architecture of an improved application server in accordance with embodiments of the invention. As is further described below, the improved application server increases the robustness (e.g., the Java robustness) of the application server through the use of isolation. For example, the isolation of inactive and active sessions improves session management and allows for shared sessions. Also, a reduction in the parallelism within virtual machines supports the use of more virtual machines. In an embodiment, shared caches (e.g., a form of shared memory) are used to reduce the memory consumption of the virtual machines. In one embodiment, a connection manager uses shared request queues (another form of shared memory) to provide failover of pending requests.

Figure 1A:
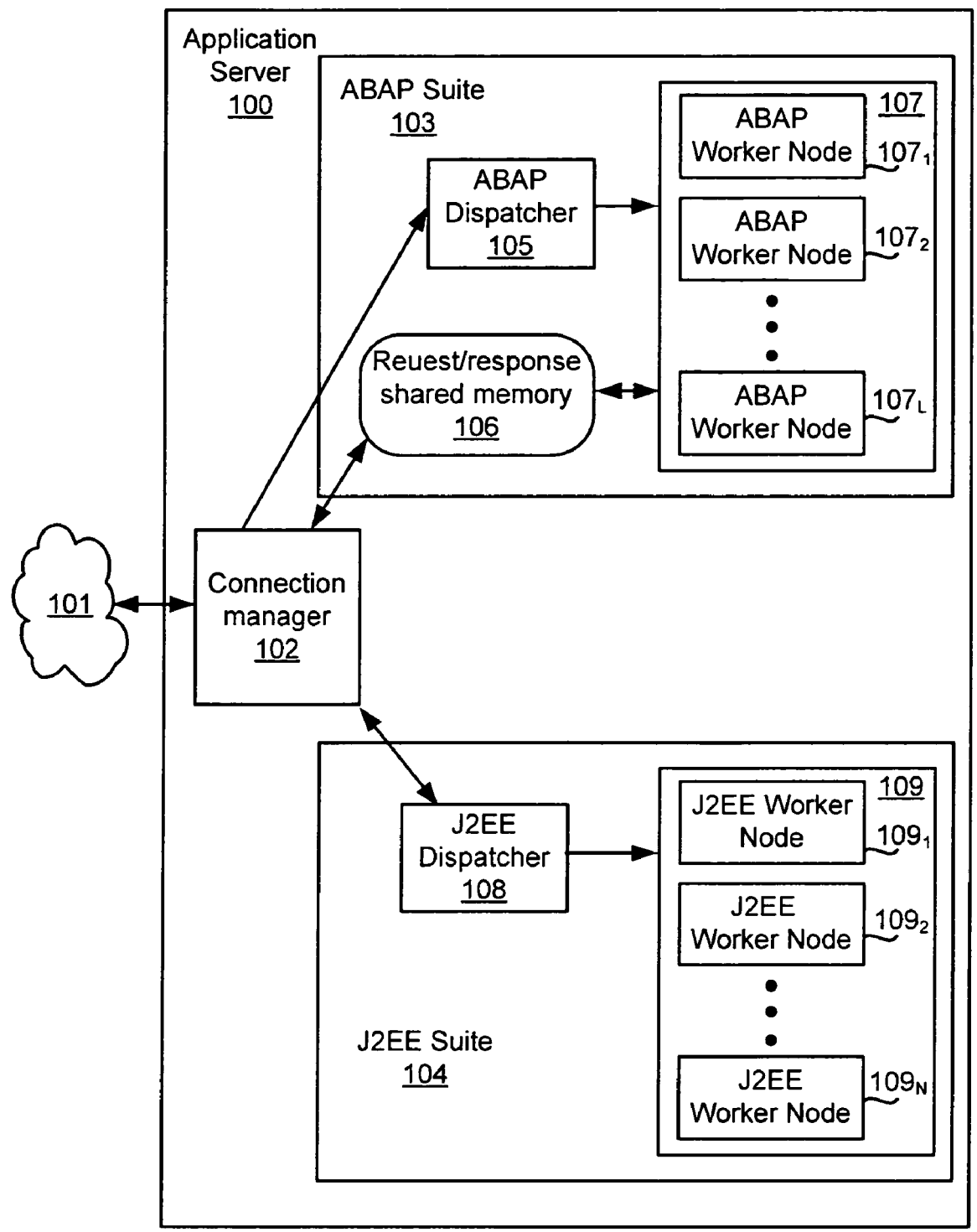
FIG. 1a shows a prior art application server.

Comparing FIGS. 1a and 2, first, note that the role of the connection manager 202 has been enhanced to at least perform dispatching 208 for the standards based software suite 204 (so as to remove the additional connection overhead associated with the prior art system's standards-based software suite dispatching procedures).

Also, the connection manager is protocol independent. A protocol handler can be plugged into the connection manager to support any one of a number of protocols by which a request can be conveyed to the connection manager. For example, handlers for protocols such as the hypertext transfer protocol (HTTP), secure HTTP (HTTPS), simple mail transfer protocol (SMTP), and network news transfer protocol (NNTP), may be provided at the connection manager so that it can receive a request conveyed from a client in accordance with any of these protocols.

In addition, the role of a shared memory has been expanded to at least include: a) a first shared memory region 250 that supports request/response data transfers not only for the proprietary suite 203 but also the standards based software suite 204; b) a second shared memory region 260 that stores session objects having "low level" session state information (e.g., information that pertains to a request's substantive response such as the identity of a specific servlet invoked through a particular web page); and, c) a third shared memory region 270 that stores "high level" session state information (e.g., information that pertains to the flow management of a request/response pair within the application server (e.g., the number of outstanding active requests for a session)).

Regarding request notification queues 212 Q1 through QM, one queue for each of the worker nodes $209_1$ through $209_M$ has been implemented within the standards-based software suite 204. In an embodiment, the shared memory structures 250, 260, 270 and request notification queues 212 help implement a fast session fail over protection mechanism in which a session that is assigned to a first worker node can be readily transferred to a second worker node upon the failure of the first worker node.

Shared memory is memory whose stored content can be reached by multiple worker nodes. Here, the contents of the shared memory region 250 can be reached by each of worker nodes in 207 and 209. Additionally, the contents of shared memory regions 260 and 270 can be reached by each of worker nodes $209_1$ through $209_M$. In one embodiment, shared memory region 260 supports shared cache 206 that can be reached by each of worker nodes $209_1$ through $209_M$.

Different types of shared memory technologies may be utilized within the application server 200 and yet still be deemed as being a shared memory structure. For example, shared memory region 250 may be implemented within a "connection" oriented shared memory technology while shared memory region 260 may be implemented with a "shared closure" oriented shared memory technology. A more thorough discussion of these two different types of shared memory implementations is provided in more detail below in section 4.0 entitled "Implementation Embodiment of Request/Response Shared Memory" and section 4.0 entitled "Implementation Embodiment of Shared Closure Based Shared Memory".

The connection oriented request/response shared memory region 250 effectively implements a transport mechanism for request/response data between the connection manager and the worker nodes. That is, because the connection manager is communicatively coupled to the shared memory, and because the shared memory is accessible to each worker node, the request/response shared memory 250—at perhaps its broadest level of abstraction—is a mechanism for transporting request/response data between the connection manager and the applicable worker node(s) for normal operation of sessions (e.g., no worker node failure) as well as those sessions affected by a worker node crash.

Although the enhancements of the application server 200 of FIG. 2 have been directed to improving the reliability of a combined ABAP/J2EE application server, it is believed that architectural features and methodologies described in more detail further below can be more generally applied to various forms of computing systems that manage communicative sessions, whether or not such computing systems contain different types of application software suites, and whether any such application software suites are standards-based or proprietary. Moreover, it is believed that such architectural features and methodologies are generally applicable regardless of any particular type of shared memory technology employed.

In operation, the connection manager 202 forwards actual request data to the first shared memory region 250 (request/response shared memory 250) regardless of whether the request is to be processed by one of the proprietary worker nodes 207 or one of the standards-based worker nodes 209. Likewise, the connection manager 202 receives response data for a request from the request/response shared memory 250 whether a proprietary worker node or a standards-based worker node generates the response.

With the exception of having to share the request/response shared memory 250 with the worker nodes 209 of the standards-based software suite 204, the operation of the proprietary software suite 203 is essentially the same as that described in the background, in one embodiment of the invention. That is, the connection manager 202 forwards request notifications to the proprietary dispatcher 205 and forwards the actual requests to the request/response shared memory 250. The proprietary dispatcher 205 then identifies which one of the proprietary worker nodes 207 is to handle the request. The identified worker node subsequently retrieves the request from the request/response shared memory 250, processes the request and writes the response into the request/response shared memory 250. The response is then forwarded from the request/response shared memory 250 to the connection manager 202 who forwards the response to the client via network 201.

In an alternative embodiment, the ABAP dispatcher 205 is integrated into the connection manager, just as the J2EE dispatcher 208. Indeed, it is contemplated that a single dispatcher may encompass the functionality of both dispatchers 205 and 208. In the case where the dispatcher 205 is integrated into the connection manager 202, the connection manager identifies which one of the proprietary worker nodes 207 is to handle a request and via its integrated dispatcher capabilities, forwards the request to the request/response shared memory 250. The identified worker node subsequently retrieves the request from the request/response shared memory 250, processes the request and writes the response into the request/response shared memory 250. The response is then forwarded from the request/response shared memory 250 to the connection manager 202 who forwards the response to the client via network 201.

2.0 Processing of a Single Request

Figure 3:
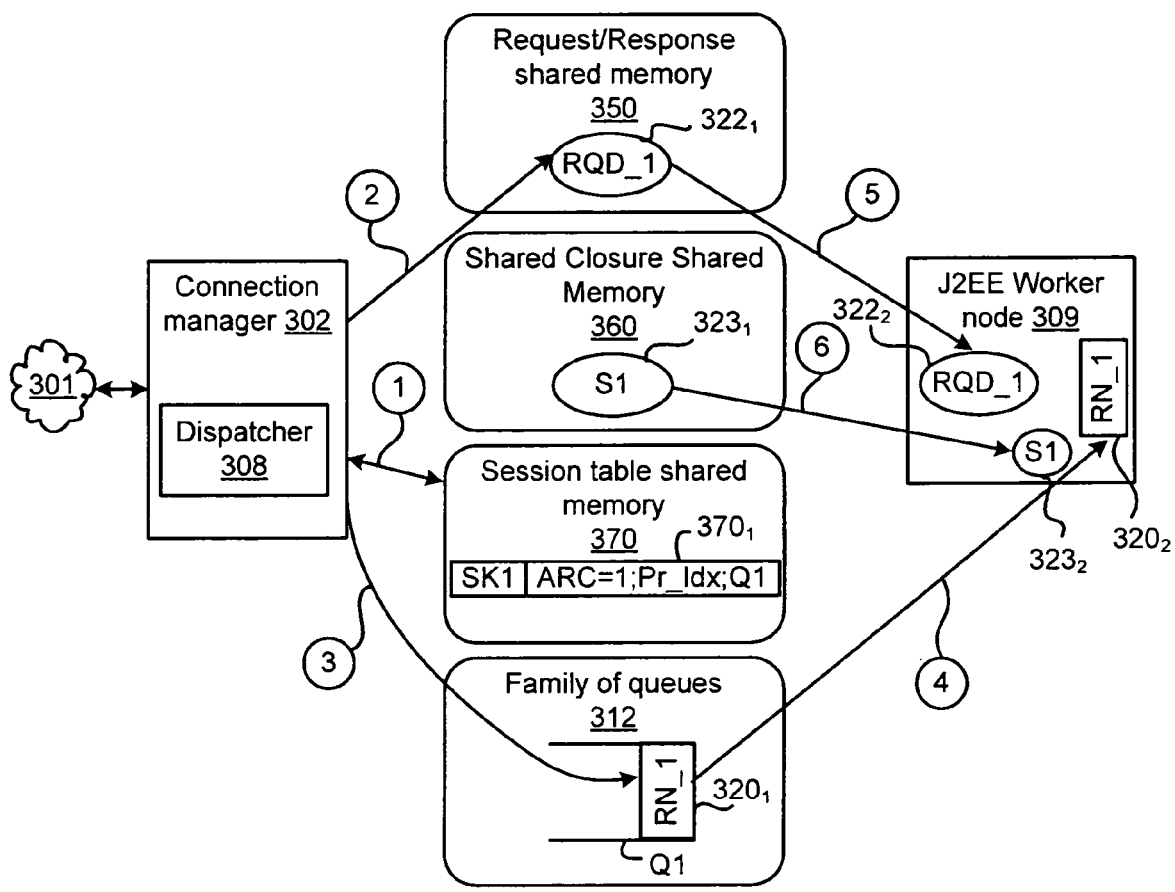
FIGS. 3 and 4 show a session request and response methodology that can be performed by the improved system of FIG. 2.
Figure 4:
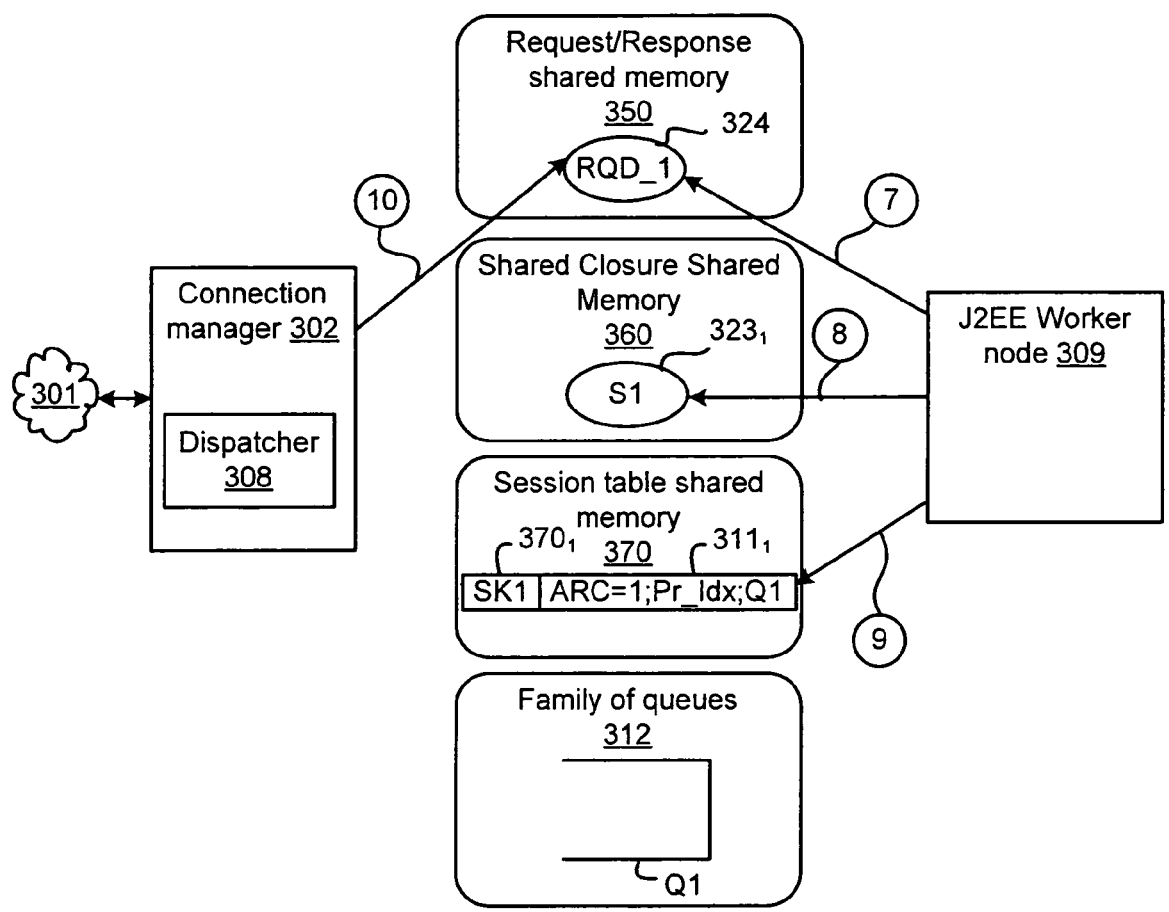

FIGS. 3 and 4 show an improved session handling flow that is used within the standards based software suite 204 of the improved application server 200 of FIG. 2. According to this flow, after the connection manager 302 receives a request from network 301 and determines that the request should be handled by the standards-based software suite, the session to which the request belongs is identified (or the request is identified as being the first request of a new session). Connection manager 302 determines the existing session to which the request belongs or that the request is from a new session through well understood techniques (e.g., through a session identifier found in the header of the received request or a URL path found in the header of the received request).

Then, the dispatcher 308 for the standards-based software suite is invoked. One possible dispatching algorithm that is executed by the dispatcher 308 is described in more detail further below in Section 3.0 entitled "Dispatching Algorithm". For purposes of the present discussion it is sufficient to realize that the dispatcher 308: 1) accesses and updates at 1 "high level" state information $370_1$ for the request's session in the shared memory session table 370 (hereinafter, referred to as session table 370); 2) determines which one 309 of the M worker nodes should handle the newly arrived request; and 3) submits at 2 the request $322_1$ into the request/response shared memory 350 and submits at 3 a request notification $320_1$ for the request $322_1$ into a request notification queue Q1 that is associated with the worker node 309 selected by the dispatching algorithm. For ease of representation, FIGS. 3 and 4 only depict the worker node 309 that has been selected by the dispatcher 308 to handle the request.

In an embodiment, there is an entry in the session table 370 for each session being supported by the M worker nodes. If the received request is for a new session (e.g., the received request is the first request of the session), the dispatcher process 308 will create at 1 a new entry $370_1$ in the session table 370 for the new session and assign at 2 one of the M worker nodes to handle the session based on a load balancing algorithm. By contrast, if the received request pertains to an already existing session, the dispatcher process 308 will access at 1 the already existing entry $370_1$ for the session and use the information therein to effectively determine the proper worker node to handle the request as well as update at 1 the session table entry $370_1$. In an embodiment, as will be described in detail further below in Section 3.0, in the case of an already existing session, the determination of the proper worker node may or may not involve the execution of a load balancing algorithm.

In an embodiment, the following items are associated with each session table entry $370_1$: 1) a "key" used to access the session table entry $370_1$ itself (e.g., session key "SK1"); 2) an active request count (ARC) that identifies the total number of requests for the session that have been received from network 301 but for which a response has not yet been generated by a worker node; 3) an identifier of the worker node 309 that is currently assigned to handle the session's requests (e.g., "Pr_Idx", which, in an embodiment, is the index in the process table of the worker node that is currently assigned to handle the session's requests); and 4) some form of identification of the request notification queue (Q1) that provides request notifications to the worker node 309 identified in 3) above.

For each request, whether a first request of a new session or a later request for an already established session, the dispatcher's dispatching algorithm 308 increments the ARC value and at 3 places a "request notification" RN_1 $320_1$, into the request notification queue Q1 that feeds request notifications to the worker node 309 that is to handle the session. The request notification RN_1 contains both a pointer to the request data RQD_1 $322_1$ in the request/response shared memory and the session key SK1 in the session table entry for the session.

The pointer to the request data in request/response shared memory 350 is generated by that portion of the connection manager 302 that stores the request data RQD_1 $322_1$ into shared memory 350 and is provided to the dispatcher 308. The pointer is used by the worker node 309 to fetch the request data RQD_1 $322_1$ from the request/response shared memory 350, and, therefore, the term "pointer" should be understood to mean any data structure that can be used to locate and fetch the request data. The worker node 309 uses the session key (or some other data structure in the request notification $RN_{\_1}$ that can be used to access the session table entry $370_1$ for the session) to access and decrement the ARC counter to indicate the worker node 309 has fully responded to the request for that session.

As will be described in more detail below in section 4.0 entitled "Implementation Embodiment of Request/Response Shared Memory," according to a particular implementation, the request/response shared memory 350 is connection based. Here, a connection is established between the targeted (assigned) worker node 309 and the connection manager 302 through the request/response shared memory 350 for each request/response cycle that is executed in furtherance of a particular session; and, a handle for a particular connection is used to retrieve a particular request from the request/response shared memory 350 for a particular request/response cycle. According to this implementation, the pointer in the request notification RN is the "handle" for the shared memory 350 connection that is used to fetch request data RQD_1 $322_1$. (The connection between the connection manager and the worker node established to handle a request/response cycle should not be confused with a network connection between a client over network 101 that is the source of the request and the application server).

In the case of a first request for a new session, the dispatcher 308 determines the worker node to be assigned to handle the session (e.g., with the assistance of a load balancing algorithm) and places the identity of the worker node's request notification queue (Q1) into a newly created session table entry $370_1$ for the session along with some form of identification of the worker node itself (e.g., "Pr_Idx", the index in the process table of the worker node that is currently assigned to handle the session's requests). For already existing sessions, the dispatcher 308 simply refers to the identify of the request notification queue (Q1) in the session's session table entry $370_1$ in order to determine into which request notification queue the request notification RN should be entered.

Continuing then with a description of the present example, with the appropriate worker node 309 being identified by the dispatcher 308, the dispatcher 308 continues with the submission at 2 of the request RQD_1 $322_1$ into the request/response shared memory 350 and the entry at 3 of a request notification RN_1 $320_1$ into the queue Q1 that has been established to supply request notifications to worker node 309. The request notification RN_1 $320_1$ sits in its request notification queue Q1 until the targeted worker node 309 foresees an ability (or has the ability) to process the corresponding request $322_1$. Recall that the request notification RN_1 $320_1$ includes a pointer to the request data itself RQD_1 $322_1$ as well as a data structure that can be used to access the entry $370_1$ in the session table (e.g., the session key SK1).

Comparing FIGS. 2 and 3, note that with respect to FIG. 2 a separate request notification queue is implemented for each worker node (that is, there are M queues, Q1 through QM, for the M worker nodes $209_1$ through $209_M$, respectively). Having a request notification queue for each worker node allows for the "rescue" of a session whose request notification(s) have been entered into the request notification queue of a particular worker node that fails ("crashes") before the request notification(s) could be serviced from the request notification queue.

When the targeted worker node 309 foresees an ability to process the request $322_1$, it looks to its request notification queue Q1 and retrieves at 4 the request notification RN_1 $320_1$ from the request notification queue Q1. FIG. 3 shows the targeted worker node 309 as having the request notification RN_1 $320_2$ to reflect the state of the worker node after this retrieval at 4. Recalling that the request notification RN_1 $320_1$ includes a pointer to the actual request RQD_1 $322_1$ within the request/response shared memory 350, the targeted worker node 309 subsequently retrieves at 5 the appropriate request RQD_1 $322_1$ from the request/response shared memory 350. FIG. 3 shows the targeted worker node 309 as having the request RQD_1 $322_2$ to reflect the state of the worker node after this retrieval at 5. In an embodiment where the request/response shared memory is connection oriented, the pointer to RQD_1 $322_1$ is a "handle" that the worker node 309 uses to establish a connection with the connection manager 302 and then read at 5 the request RQD_1 $322_1$ from the request/response shared memory.

The targeted worker node 309 also assumes control of one or more "session" objects S1 $323_2$ used to persist "low level" session data. Low level session data pertains to the request's substantive response rather than its routing through the application server. If the request is the first request for a new session, the targeted worker node 309 creates the session object(s) S1 $323_2$ for the session; or, if the request is a later request of an existing session, the targeted worker node 309 retrieves at 6 previously stored session object(s) S1 $323_1$ from the "shared closure" memory region 360 into the targeted worker node $323_2$. The session object(s) S1 may $323_1$ be implemented as a number of objects that correspond to a "shared closure". A discussion of shared closures and an implementation of a shared closure memory region 360 is provided in more detail further below in section 4.0 entitled "Implementation Embodiment of Shared Closure Based Shared Memory"

With respect to the handling of a new session, the targeted worker node 309 generates a unique identifier for the session object(s) S1 $323_1$ according to some scheme. In an embodiment, the scheme involves a random component and an identifier of the targeted worker node itself 309. Moreover, information sufficient to identify a session uniquely (e.g., a sessionid parameter from a cookie that is stored in the client's browser or the URL path of the request) is found in the header of the request RQD_1 322$_2$ whether the request is the first request of a new session or a later requests of an existing session. This information can then be used to fetch the proper session object(s) S1 323$_1$ for the session.

FIG. 4 depicts the remainder of the session handling process. With the targeted worker node 309 having the request RQD_1 322$_2$ and low level session state information via session object(s) S1 323$_2$, the request is processed by the targeted worker node 309 resulting in the production of a response 324 that is to be sent back to the client. The worker node 309 writes at 7 the response 324 into the response/request shared memory 350; and, if a change to the low level session state information was made over the course of generating the response, the worker node 309 writes at 8 updated session object(s) into the shared closure memory 360. Lastly, the worker node 309 decrements at 9 the ARC value (311) in the session table entry 370$_1$ to reflect the fact that the response process has been fully executed from the worker node's perspective and that the request has been satisfied. Here, recall that a segment of the request notification RN_1 320$_2$ (e.g., the session key SK1) can be used to find a "match" to the correct entry 370$_1$ in the session table 370 in order to decrement the ARC value for the session.

In reviewing the ARC value across FIGS. 3 and 4, note that it represents how many requests for the session the connection manager has received from network 301 but for which no response has yet been generated by a worker node. In the example provided with reference to FIGS. 3 and 4 only one request is outstanding at any one point in time, hence, the ARC value never exceeds a value of 1. Conceivably, multiple requests for the same session could be received from network 301 prior to any responses being generated. In such a case the ARC value will indicate the number of requests that is queued or is currently being processed by one or more worker nodes but for which no response has been generated.

After the response 324 is written at 7 into the request/response shared memory 350, it is retrieved at 10 into the connection manager 302 which then sends it to the client over network 301.

The ARC value for the session is incremented in the session's session table entry and the request notification RN for the session is directed to the request notification queue for the new worker node that has just been assigned to handle the session 408.

3.0 Implementation Embodiment of Request/Response Shared Memory

Recall from above that according to a particular implementation, the request/response shared memory 250 has a connection oriented architecture. Here, a connection is established between the targeted worker node and the connection manager across the request/response shared memory 350 for each request/response cycle between the connection manager and a worker node. Moreover, a handle to a particular connection is used to retrieve a particular request from the request/response shared memory.

The connection oriented architecture allows for easy session handling transfer from a crashed worker node to a new worker node because the routing of requests to a new targeted worker node is accomplished merely by routing the handle for a specific request/response shared memory connection to the new worker node. That is, by routing the handle for a request/response shared memory connection to a new worker node, the new worker node can just as easily "connect" with the connection manager to obtain a request as the originally targeted (but now failed) worker node. Here, the "pointer" contained by the request notification is the handle for the request's connection.

Figure 5:
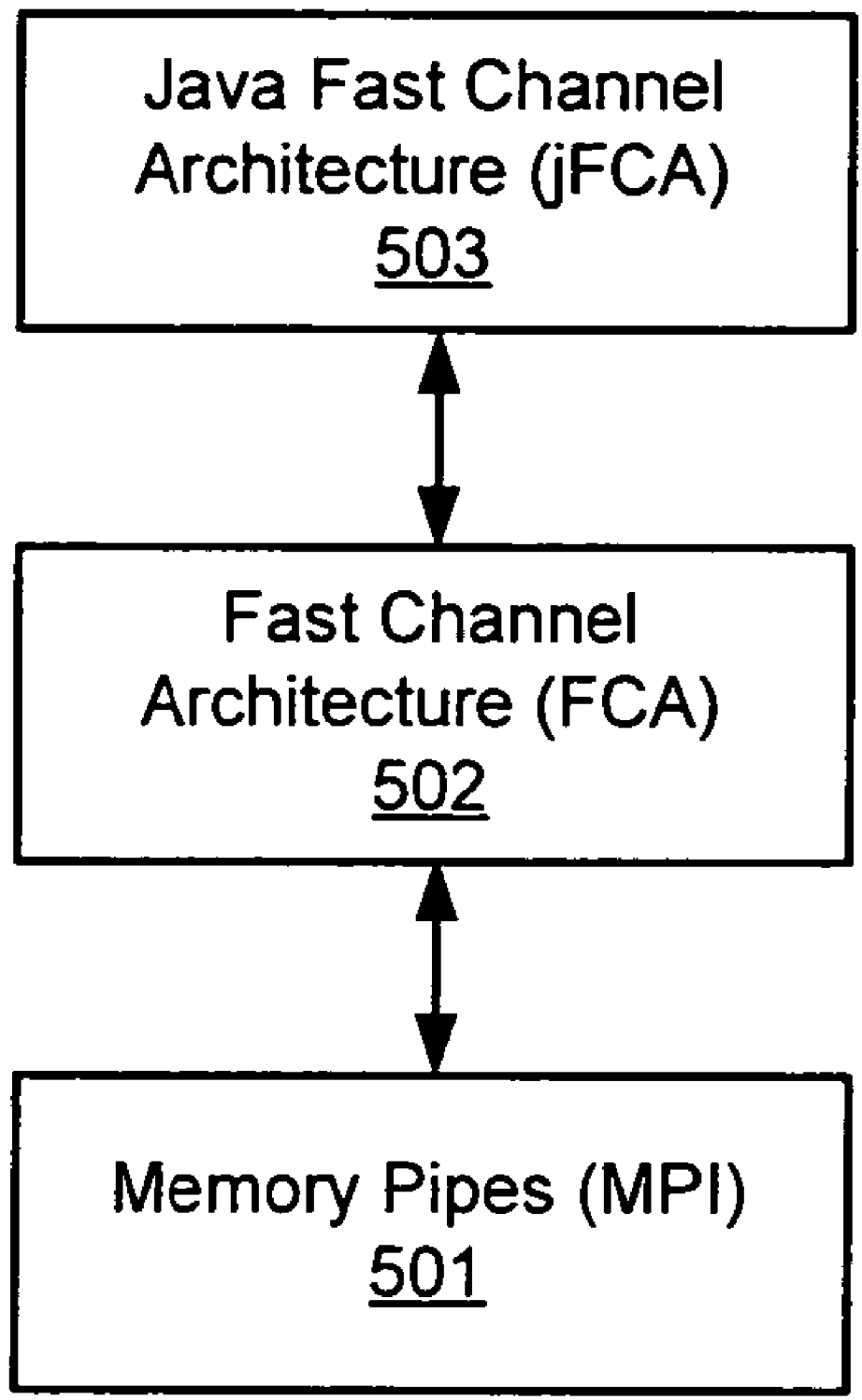
FIG. 5 shows different layers of a shared memory access technology.

FIG. 5 shows an embodiment of an architecture for implementing a connection based queuing architecture. According to the depiction in FIG. 5, the connection based queuing architecture is implemented at the Fast Channel Architecture (FCA) level 502. The FCA level 502 is built upon a Memory Pipes technology 501 which is a legacy "semaphore based" request/response shared memory technology 106 referred to in the Background. The FCA level 502 includes an API for establishing connections with the connection manager and transporting requests through them.

In a further embodiment, referring to FIGS. 2 and 5, the FCA level 502 is also used to implement each of the request notification queues 212. As such, the request notification queues 212 are also implemented as a shared memory technology. Notably, the handlers for the request notification queues 212 provide more permanent associations with their associated worker nodes. That is, as described, each of the request notification queues 212 is specifically associated with a particular worker node and is "on-going". By contrast, each request/response connection established across request/response shared memory 250 is made easily useable for any worker node (to support fail over to a new worker node), and, according to an implementation, exist only for each request/response cycle.

Above the FCA level 502 is the Java FCA (jFCA) level 503. The jFCA level 503 is essentially an Application Program Interface (API) used by the Java worker nodes and relevant Java parts of the connection manager to access the FCA level 502. In an embodiment, the jFCA level is modeled after standard Java Networks Socket technology. At the worker node side, however, a "jFCA connection" is created for each separate request/response cycle through request/response shared memory; and, a "jFCA queue" is created for each request notification queue. Thus, whereas a standard Java socket will attach to a specific "port" (e.g., a specific TCP/IP address), according to an implementation, the jFCA API will establish a "jFCA queue" that is configured to implement the request notification queue of the applicable worker node and a "jFCA connection" for each request/response cycle.

Here, an instance of the jFCA API includes the instance of one or more objects to: 1) establish a "jFCA queue" to handle the receipt of request notifications from the worker node's request notification queue; 2) for each request notification, establishing a "jFCA connection" over request/response shared memory with the connection manager so that the corresponding request from the request/response shared memory can be received (through the jFCA's "InputStream"); and, 3) for each received request, the writing of a response back to the same request/response shared memory connection established for the request (through the jFCA's "OutputStream").

In the outbound direction (e.g., from the worker node to the connection manager), in an embodiment, the same jFCA connection that is established through the request/response shared memory between the worker node and the connection manager for retrieving the request data is used to transport the response back to the connection manager.

In a further embodiment, a service (e.g., an HTTP service) is executed at each worker node that is responsible for managing the flow of requests/responses and the application(s) invoked by the requests sent to the worker node. In a further embodiment, in order to improve session handling capability, the service is provided its own "dedicated thread pool" that is separate from the thread pool that is shared by the worker node's other applications. By so doing, a fixed percentage of the worker node's processing resources are allocated to the service regardless of the service's actual work load. This permits the service to immediately respond to incoming requests during moments of light actual service work load and guarantees a specific amount of performance under heavy actual service workload.

According to one implementation, each thread in the dedicated thread pool is capable of handling any request for any session. An "available" thread from the dedicated thread pool listens for a request notification arriving over the jFCA queue. The thread services the request from the jFCA queue and establishes the corresponding jFCA connection with the handler associated with the request notification and reads the request from request/response shared memory. The thread then further handles the request by interacting with the session information associated with the request's corresponding session.

Each worker node may have its own associated container(s) in which the service runs. A container is used to confine/define the operating environment for the application thread(s) that are executed within the container. In the context of J2EE, containers also provide a family of services that applications executed within the container may use (e.g., Java Naming and Directory Interface (JNDI), Java Database Connectivity (JDBC), Java Messaging Service (JMS) among others).

Different types of containers may exist. For example, a first type of container may contain instances of pages and servlets for executing a web based "presentation" for one or more applications. A second type of container may contain granules of functionality (generically referred to as "components" and, in the context of Java, referred to as "beans") that reference one another in sequence so that, when executed according to the sequence, a more comprehensive overall "business logic" application is realized (e.g., stringing revenue calculation, expense calculation and tax calculation components together to implement a profit calculation application).

4.0 Implementation Embodiment of Shared Closure Based Shared Memory

Figure 1B:
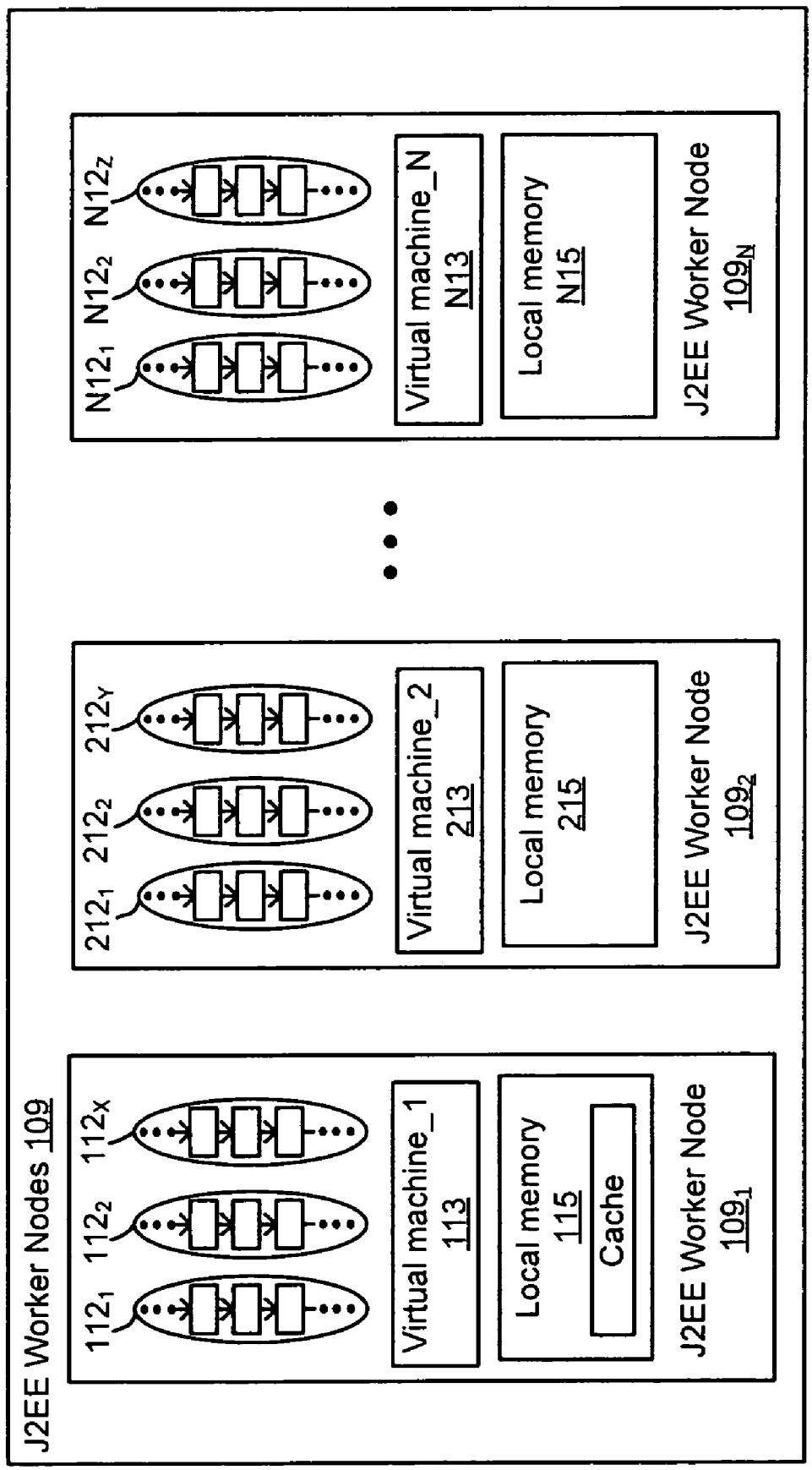
Figure 6:
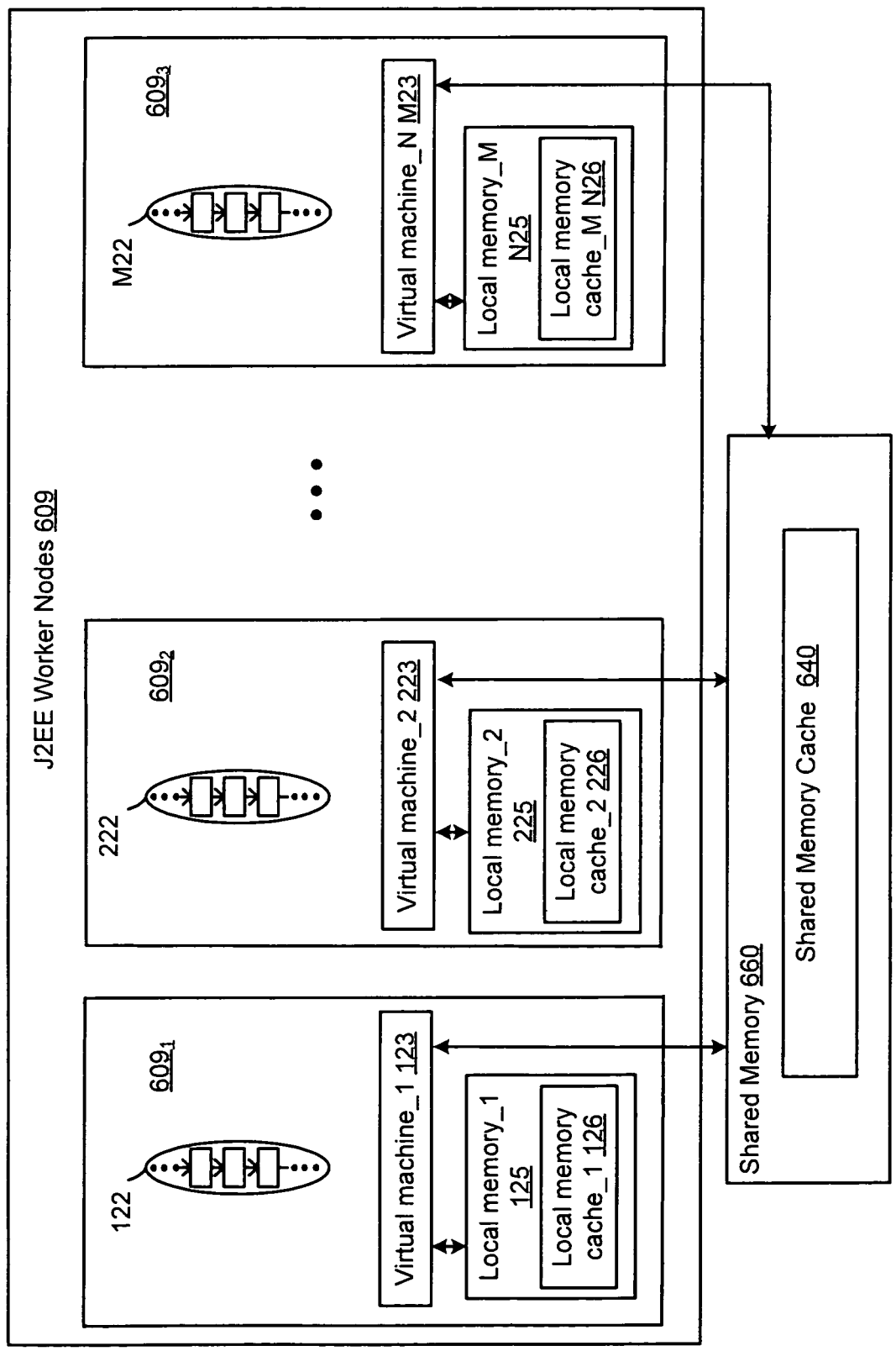
FIG. 6 shows a depiction of a shared closure based shared memory system.

Recall from the Background in the discussion pertaining to FIG. 1b that the worker nodes 109 depicted therein engage in an extensive number of application threads per virtual machine. FIG. 6 shows worker nodes 609 that can be viewed as a detailed depiction of an implementation for worker nodes 209 of FIG. 2; where, the worker nodes 209, 609 are configured with fewer application threads per virtual machine than the prior art approach of FIG. 1b. Fewer application threads per virtual machine results in less application thread crashes per virtual machine crash; which, in turn, should result in the new standards-based suite 204 of FIG. 2 exhibiting better reliability than the prior art standards-based suite 104 of FIG. 1a.

According to the depiction of FIG. 6, which is an extreme representation of the improved approach, only one application thread exists per virtual machine (specifically, thread 122 is being executed by virtual machine 123; thread 222 is being executed by virtual machine 223; . . . and, thread M22 is being executed by virtual machine M23). In practice, the worker nodes 609 of FIG. 6 may permit a limited number of threads to be concurrently processed by a single virtual machine rather than only one.

In order to concurrently execute a comparable number of application threads as the prior art worker nodes 109 of FIG. 1b, the improved worker nodes 609 of FIG. 6 instantiate more virtual machines than the prior art worker nodes 109 of FIG. 1b. That is, M>N.

Thus, for example, if the prior art worker nodes 109 of FIG. 1b have 10 application threads per virtual machine and 4 virtual machines (e.g., one virtual machine per CPU in a computing system having four CPUs) for a total of 4×10=40 concurrently executed application threads for the worker nodes 109 as a whole, the improved worker nodes 609 of FIG. 6 may only permit a maximum of 5 concurrent application threads per virtual machine and 6 virtual machines (e.g., 1.5 virtual machines per CPU in a four CPU system) to implement a comparable number (5×6=30) of concurrently executed threads as the prior art worker nodes 109 of FIG. 1b.

In an embodiment, J2EE worker nodes 609 provide a fixed number of execution units (e.g., threads) per CPU based, at least in part, on the input/output ratio of an application. In prior art worker nodes 109 (shown in FIG. 1B) the execution units (e.g., threads) are distributed over a few virtual machines (e.g., operating system processes) and therefore there is a high degree of parallelism inside the virtual machines. In contrast, worker nodes 609 dramatically reduce the parallelism by increasing the number of virtual machines (e.g., operating system processes) and decreasing the execution units (e.g., threads) per virtual machine. In the illustrated embodiment, this concept is taken to an isolation level in which one execution unit (e.g., 122-M22) is running inside one virtual machine (e.g., 123-M23). The thread scheduler (not shown) of the operating system decides where and when a thread is executed.

Recall from the discussion of FIG. 1b that a virtual machine can be associated with its own local memory. Because the improved worker nodes 609 of FIG. 6 instantiate more virtual machines than the prior art working nodes 109 of FIG. 1b, in order to conserve memory resources, the virtual machines 123, 223, . . . M23 of the worker nodes 609 of FIG. 6 are configured with less local memory space 125, 225, . . . M25 than the local memory space 115, 215, . . . N15 of virtual machines 113, 213, . . . N23 of FIG. 1b. Moreover, the virtual machines 123, 223, . . . M23 of the worker nodes 609 of FIG. 6 are configured to use a shared memory 660. Shared memory 660 is memory space that contains items that can be accessed by more than one virtual machine (and, typically, any virtual machine configured to execute "like" application threads that is coupled to the shared memory 660).

Thus, whereas the prior art worker nodes 109 of FIG. 1b use fewer virtual machines with larger local memory resources containing objects that are "private" to the virtual machine; the worker nodes 609 of FIG. 6, by contrast, use more virtual machines with less local memory resources. The less local memory resources allocated per virtual machine is compensated for by allowing each virtual machine to access additional memory resources. However, owing to limits in the amount of available memory space, this additional memory space 660 is made "shareable" amongst the virtual machines 123, 223, . . . M23.

According to an object oriented approach where each of virtual machines 123, 223, . . . M23 does not have visibility into the local memories of the other virtual machines, specific rules are applied that mandate whether or not information is permitted to be stored in shared memory 660. Specifically, to first order, according to an embodiment, an object residing in shared memory 660 should not contain a reference to an object located in a virtual machine's local memory because an object with a reference to an unreachable object is generally deemed "non useable".

That is, if an object in shared memory 660 were to have a reference into the local memory of a particular virtual machine, the object is essentially non-useable to all other virtual machines; and, if shared memory 660 were to contain an object that was useable to only a single virtual machine, the purpose of the shared memory 660 would essentially be defeated.

In order to uphold the above rule, and in light of the fact that objects frequently contain references to other objects (e.g., to effect a large process by stringing together the processes of individual objects; and/or, to effect relational data structures), "shareable closures" are employed. A "closure" is a group of one or more objects where every reference stemming from an object in the group that references another object does not reference an object outside the group. That is, all the object-to-object references of the group can be viewed as closing upon and/or staying within the confines of the group itself. Note that a single object without any references stemming from can be viewed as meeting the definition of a closure.

If a closure with a non shareable object were to be stored in shared memory 660, the closure itself would not be shareable with other virtual machines, which, again, defeats the purpose of the shared memory 660. Thus, in an implementation, in order to keep only shareable objects in shared memory 660 and to prevent a reference from an object in shared memory 660 to an object in a local memory, only "shareable" (or "shared") closures are stored in shared memory 660. A "shared closure" is a closure in which each of the closure's objects is "shareable".

A shareable object is an object that can be used by other virtual machines that store and retrieve objects from the shared memory 660. As discussed above, in an embodiment, one aspect of a shareable object is that it does not possess a reference to another object that is located in a virtual machine's local memory. In an embodiment, additional conditions may also apply to a shareable object. For example, according to a particular Java embodiment, a shareable object must also posses the following characteristics: 1) it is an instance of a class that is serializable; 2) it is an instance of a class that does not execute any custom serializing or deserializing code; 3) it is an instance of a class whose base classes are all serializable; 4) it is an instance of a class whose member fields are all serializable; 5) it is an instance of a class that does not interfere with proper operation of a garbage collection algorithm; and, 6) its finalize ( ) method is not overwritten.

Exceptions to the above criteria are possible if, for example, a copy operation used to copy a closure into shared memory 660 (or from shared memory 660 into a local memory) can be shown to be semantically equivalent to serialization and deserialization of the objects in the closure. Examples include instances of the Java 2 Platform, Standard Edition 1.3 java.lang.String class and java.util.Hashtable class.

A container is used to confine/define the operating environment for the application thread(s) that are executed within the container. In the context of J2EE, containers also provide a family of services that applications executed within the container may use (e.g., (e.g., Java Naming and Directory Interface (JNDI), Java Database Connectivity (JDBC), Java Messaging Service (JMS) among others).

Figure 7:
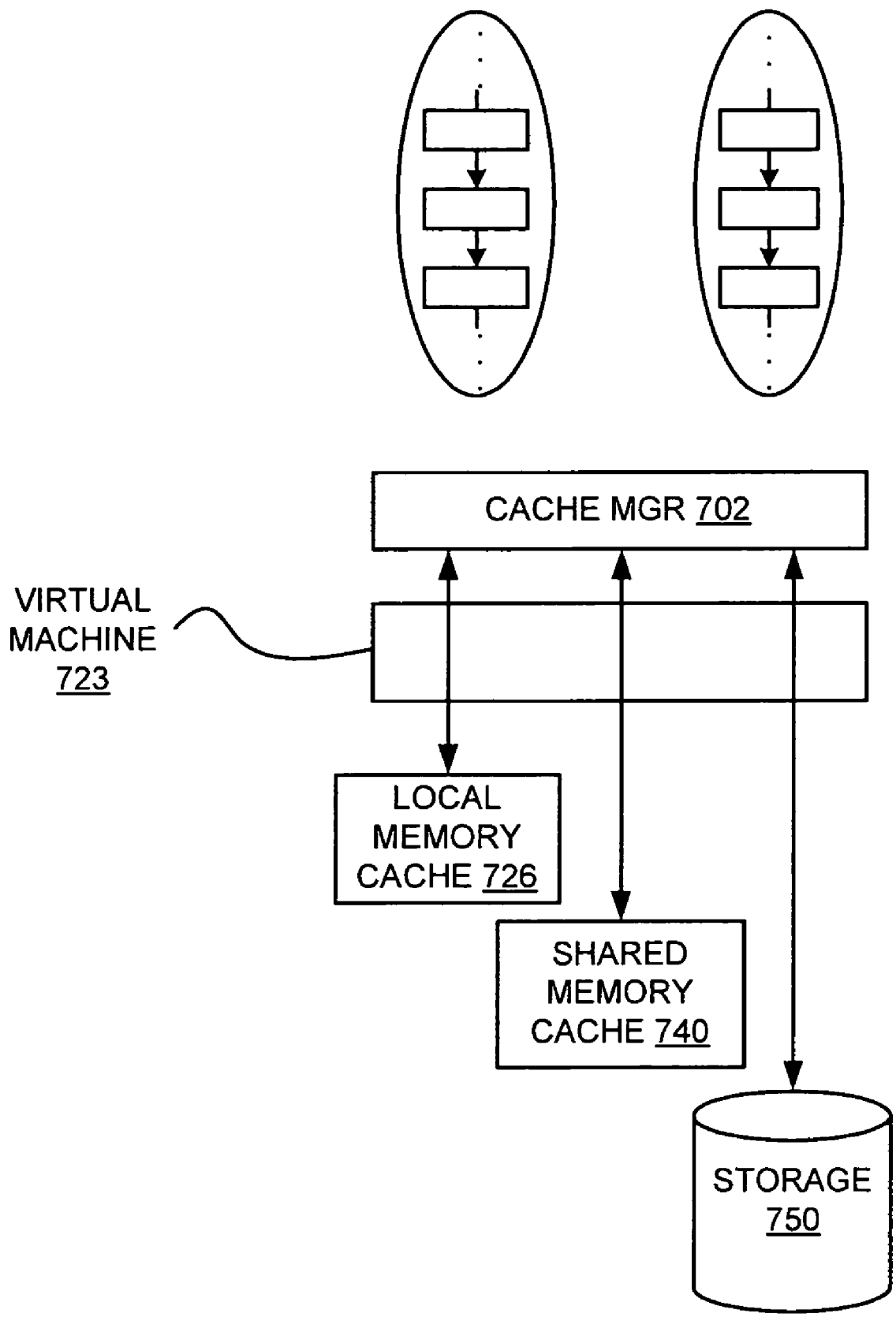
FIG. 7 shows a depiction of a cache management service that can, for example, be added to the suite of services offered by a container to support one or more application thread(s)

Note that the introduction of the shared memory 660 introduces the prospect of a shared cache 640. Thus, the architecture of FIG. 6 includes both local memory level caches 126, 226, . . . N26 and a shared memory cache 640. FIG. 7 shows a depiction of a cache management service 702 that can, for example, be added to the suite of services offered by a container to support one or more application thread(s).

FIG. 7 shows that more than one thread can be actively processed by the virtual machine 723 depicted therein. It should be understood that, in accordance with the discussion concerning FIG. 6, the number of threads that the virtual machine 723 can concurrently entertain should be limited (e.g., to some fixed number) to reduce the exposure to a virtual machine crash. For example, according to one implementation, the default number of concurrently executed threads is 5. In a further implementation, the number of concurrently executed threads is a configurable parameter so that, conceivably, for example, in a first system deployment there are 10 concurrent threads per virtual machine, in a second system deployment there are 5 concurrent threads per virtual machine, in a third system deployment there is 1 concurrent thread per virtual machine. It is expected that a number of practical system deployments would choose less than 10 concurrent threads per virtual machine.

The cache management service 702 is configured to have visibility into the local memory cache 726 of the virtual machine 723, the shared memory cache 740 and one or more other storage resources 750 such as a database or file system used for storing persisted objects. Here, different applications whose abstract code (e.g., Java byte code in the case of Java) is executed by virtual machine 723 can specially configure the cache management service 702 to treat its cached objects in accordance with specific guidelines.

According to various schemes, the cache manager 702 effectively configures regions of cache for the storage of objects in local cache memory 726 and/or in shared memory cache 740 according to different treatment policies. Multiple cache regions defining different cache treatments may be established for a single application. Cached objects placed in local memory cache 726 may be conveniently utilized by the virtual machine 723 associated with the local memory where local cache 726 resides for quick processing by the application. By contrast, cached objects placed in shared memory cache 640 may be utilized by the local virtual machine 723 as well as other virtual machines that have visibility into the shared memory in which the shared memory cache 640 is implemented.

Figure 8:
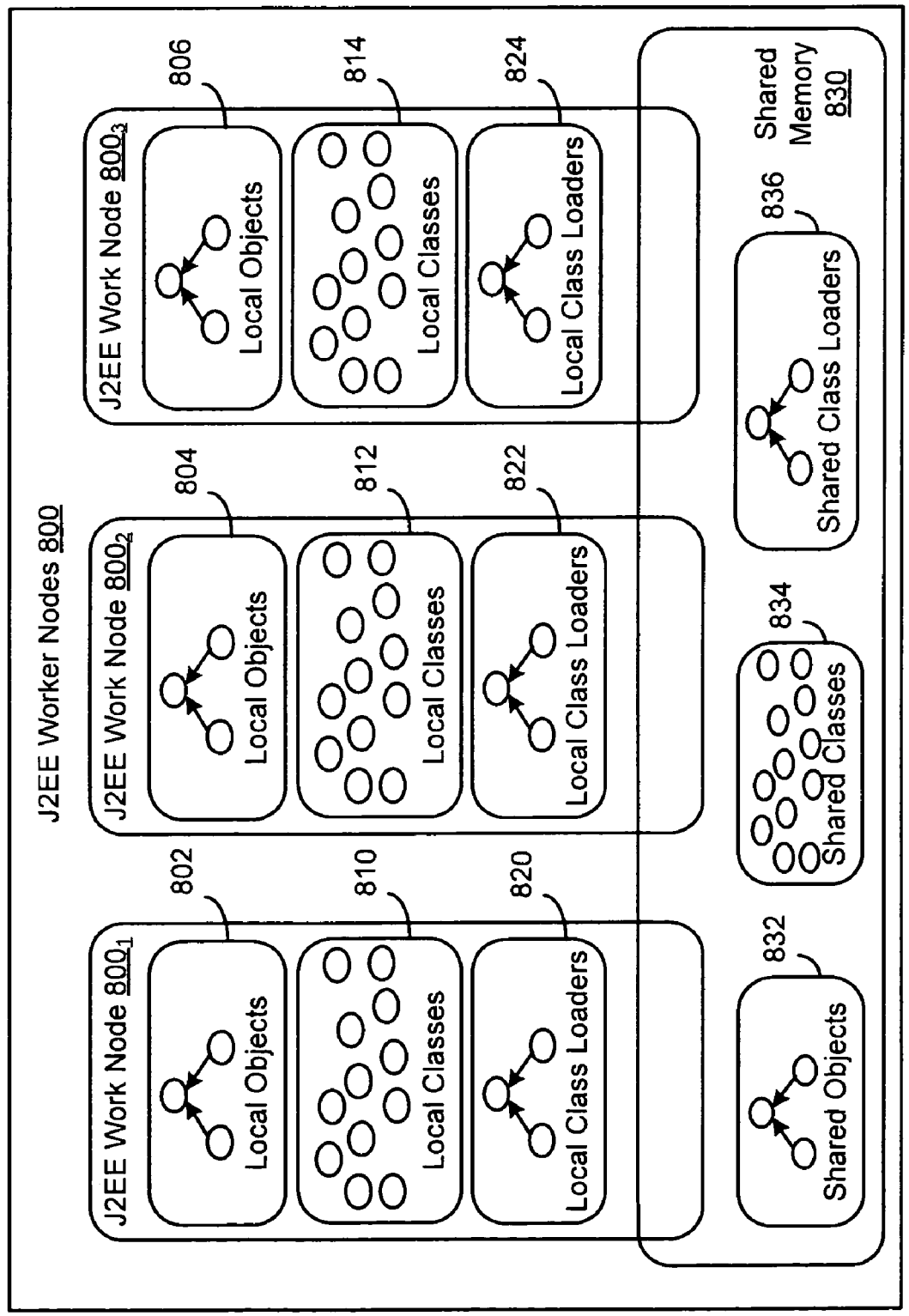
FIG. 8 is a block diagram illustrating an embodiment in which a number of J2EE worker nodes share one or more class loaders.

The introduction of a shared memory (e.g., shared memory 660, shown in FIG. 6) to share objects also introduces the prospect of shared class loaders. FIG. 8 is a block diagram illustrating an embodiment in which a number of worker nodes share one or more class loaders. In an embodiment, the worker nodes are based, at least in part, on the J2EE standard. It is to be appreciated, however, that in an alternative embodiment, the worker nodes may be based on a different standard. J2EE worker nodes 800, include local objects 802-806, local classes 810-814, and local class loaders 820-824. These local objects 802-806, local classes 810-814, and local class loaders are only visible to the J2EE worker node that is local to a given object, class, or class loader.

J2EE worker nodes 800 also each have access to shared memory 830. In an embodiment, shared memory 830 is a shared closure based shared memory substantially similar to shared memory 660, shown in FIG. 6. Shared memory 830 includes shared objects 832, shared classes 834, and shared class loaders 836. Shared objects 832 are objects that can be shared among J2EE worker nodes 800. Sharing objects implies that J2EE worker nodes 800 have access to common class definitions. Shared classes 834 provide the common class definitions to support shared objects 832. In an embodiment, J2EE worker nodes 800 can access shared classes 834 without having to physically load the classes.

Shared class loaders 836 are class loaders that reside in shared memory 830 and load shared classes 834. In an embodiment, shared class loaders 836 have certain properties. For example, in one embodiment, shared class loaders 836 are created through a factory and cannot be modified after they are created. The property that shared class loaders 834 are created through a factory implies that, in an embodiment, custom shared class loaders are not used. The property that shared class loaders 834 cannot be modified after they are created indicates that references (e.g., to other components) are not added to or removed from a class loader after it is created.

In an embodiment, two shared class loaders 834 are considered identical if all of their properties are identical. For example, if a shared class loader can load a number of Java Archive (JAR) files, then another shared class loader would be identical if it has the same properties as the first class loader including the ability to load the same JAR files in the same order. As mentioned above, in an embodiment, shared class loaders 834 are created by a factory. In one embodiment, the factory first checks for the existence of a requested class loader before creating the class loader. If the requested class loader already exists, then the factory returns a reference to the preexisting class loader rather than an instance of the shared class loader.

Figure 9:
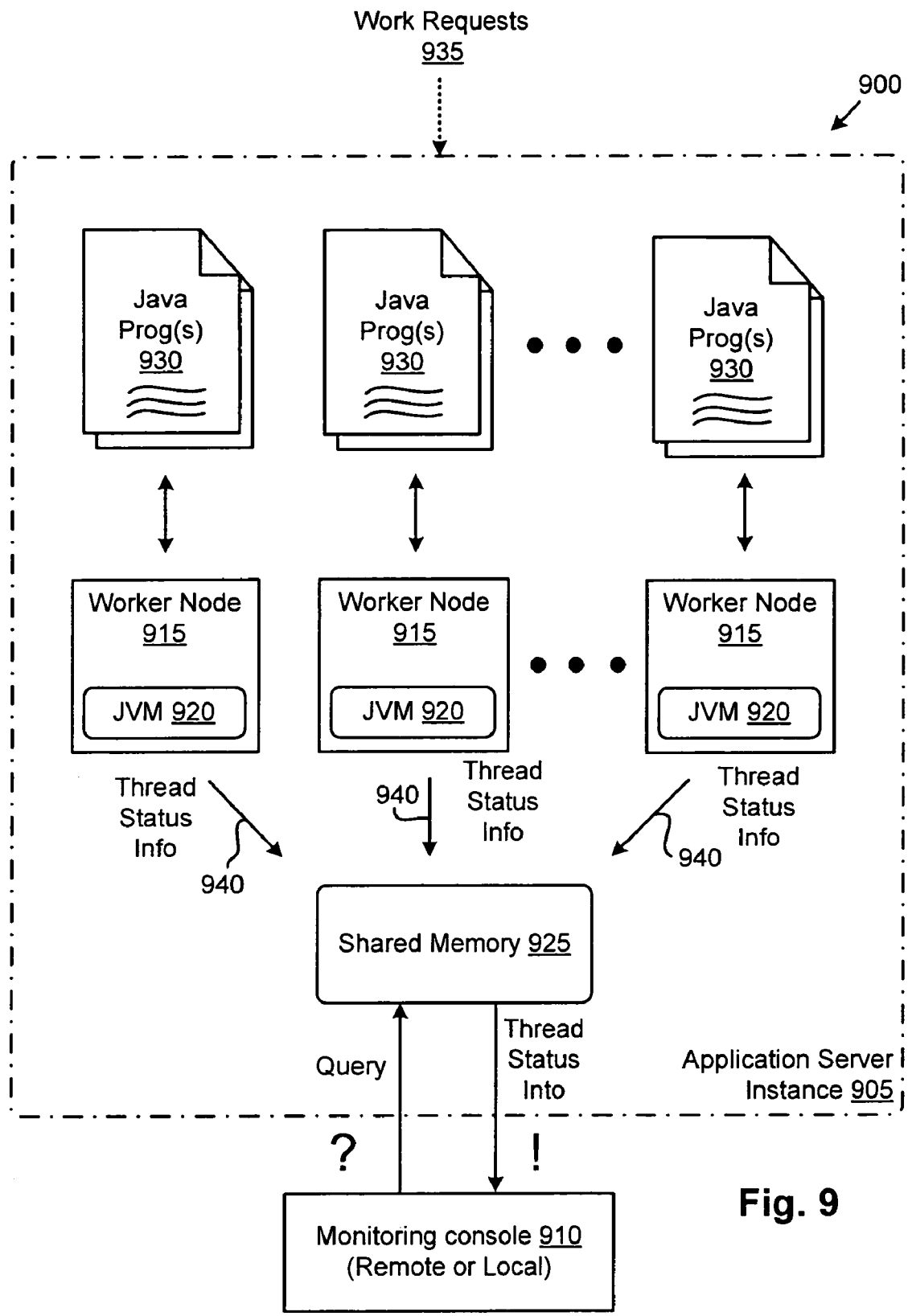
FIG. 9 is a block diagram illustrating a software system for monitoring worker threads within multiple Java virtual machines of an application server instance, in accordance with an embodiment of the inventor.

FIG. 9 is a block diagram illustrating a software system 900 for monitoring worker threads within multiple Java virtual machines ("JVMs") of an application server ("AS") instance 905, in accordance with an embodiment of the invention. The illustrated embodiment of software system 900 includes AS instance 905 and a monitoring console 910. The illustrated embodiment of AS instance 905 includes one or more worker nodes 915 each including a JVM 920, and shared memory 925. Java worker nodes 915 provide the runtime environment for JVMs 920, which in turn interpret/execute Java programs 930.

Collectively, Java programs 930 may provide the logic for implementing various sub-layers (e.g., business layer, integration layer, presentation layer, etc.) of AS instance 905. In one embodiment, AS instance 905 is a web application server, such as Web AS by SAP, .NET by Microsoft, or the like. In one embodiment, AS instance 905 represents a Java 2 Platform, Enterprise Edition ("J2EE") instance for providing enterprise software functionality. It should be appreciated that various components of AS instance 905 have been excluded from FIG. 9 for the sake of clarity and so as not to obscure the invention. Although FIG. 9 illustrates three worker nodes 915 within AS instance 905, more or less worker nodes 915 may be established within AS instance 905.

During operation, work requests 935 may be received at AS instance 905 and assigned to any of worker nodes 915 for servicing. JVMs 920 within each worker node 915 may execute Java programs 930 containing logic for servicing the received work requests 935. Each work request 935 may require performing one or more tasks (e.g., retrieve a name and address from a database) which may also include one or more subtasks (e.g., fetch data from database, render data for output, clean memory). To perform multiple tasks in parallel, each JVM 920 may maintain a thread pool having a number of available worker threads to perform the tasks. While performing these tasks and subtasks, each of the worker threads is capable of reporting thread status information 940 into shared memory 925.

Once thread status information 940 is reported into shared memory 925, monitoring console 910 can query shared monitoring memory 925 to display thread status information 940 for review by an Information Technology ("IT") technician. Monitoring console 910 may be located locally on the same hardware machine executing AS instance 905, or advantageously, executed on a remote machine couple to a network. Monitoring console 910 may further monitor an entire cluster of AS instances 905, all from a single remote machine. Using monitoring console 910, the IT technician can remotely monitor the status and operational health of worker threads within each JVM 920 in real-time to ensure AS instance 905 remains in a healthful state. Shared memory 925 working in concert with monitoring console 910, enables the IT technician to make informed decisions when taking preventative and/or remedial action to effectively maintain and manage an enterprise system.

Figure 10:
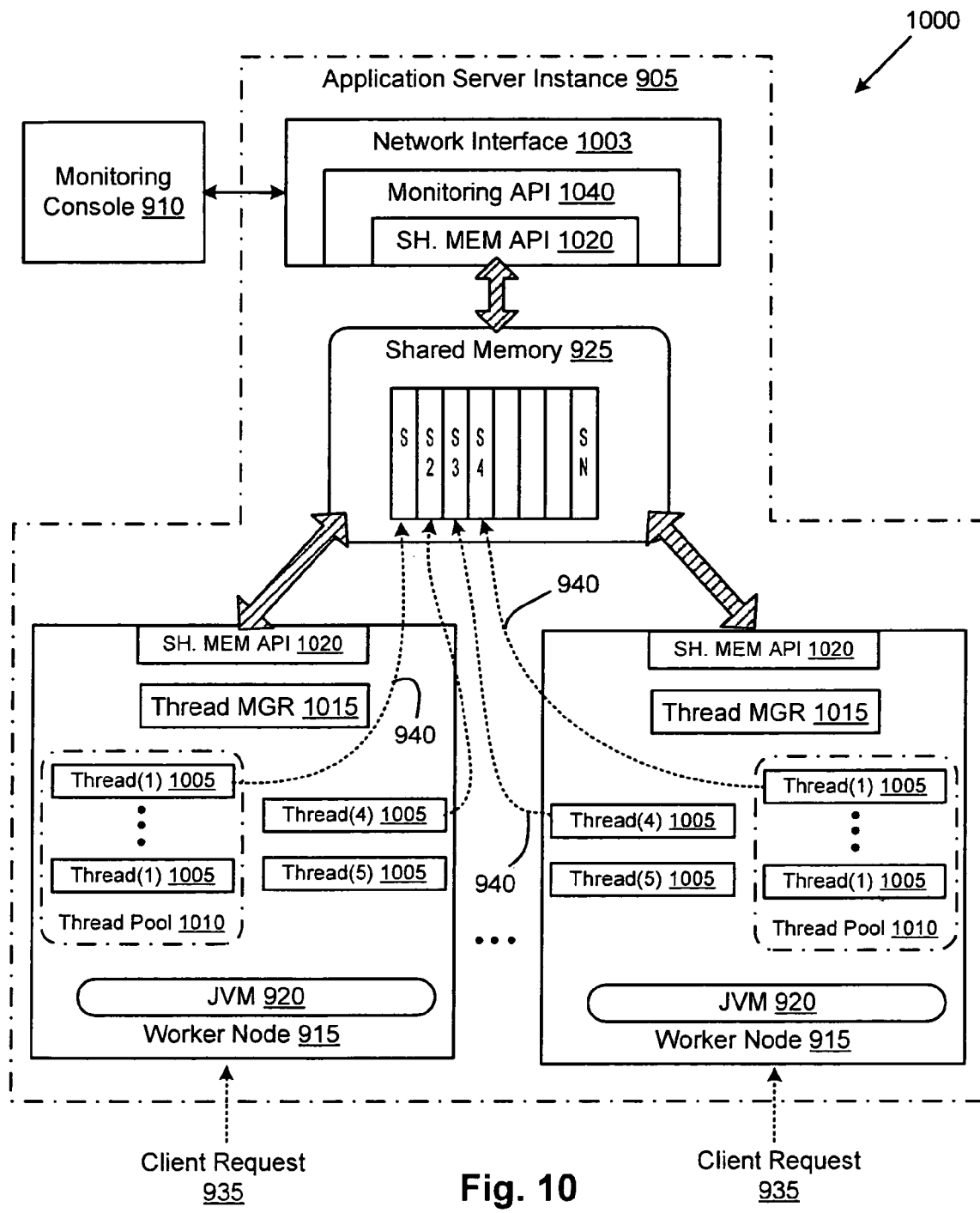
FIG. 10 is a block diagram illustrating a software system for storing thread status information into a shared memory and reporting the thread status information to a monitoring console, in accordance with an embodiment of the invention.

FIG. 10 is a block diagram illustrating a software system 1000 including AS instance 905 for monitoring worker threads, in accordance with an embodiment of the invention. FIG. 10 provides further detail of AS instance 905, including a network interface 1003, as well as, worker nodes 915 and shared memory 925. As illustrated, each worker node 915 includes a JVM 920, one or more worker threads 1005, a thread pool 1010, a thread manager 1015, and a share memory application programming interface ("API") 1020.

Thread manager 1015 creates and manages worker threads 1005 and thread pool 1010. Each worker thread 1005 provides a "thread of execution" which may be assigned a task to perform. In general, worker threads 1005 share a common address space and run in a quasi-parallel manner. The common address space is reserved by JVM 920 and may contain program text (e.g., Java programs 930) and data, as well as other resources. Each worker thread 1005 may include a program counter that keeps track of which instruction to execute next, registers that hold current working variables, and a call stack that contains the execution history (i.e., procedure call history) of the particular worker thread 1005. Worker threads 1005 enable each JVM 920 to achieve parallelism to perform multiple tasks in a quasi-parallel manner, while supporting sequential processes that make use of blocking system calls (e.g., disk input/output access).

Thread manager 1015 acts as a factory for worker threads 1005 using an extended thread class, which contains reporting methods for reporting thread status information 940 into shared memory 925. In one embodiment, thread manager 1015 is an entity (e.g., Java object) interpreted and executed by JVM 920. In one embodiment, worker threads 1005 are Java objects running within JVM 920. When one of worker threads 1005 is created, it is instantiated with the extended thread class, thereby inheriting the reporting methods and the ability to report thread status information 940 into shared memory 925. Once one of worker threads 1005 is instantiated, it may be said that the worker thread is "instrumented" with reporting functionality.

In one embodiment, these reporting methods perform reporting tasks that are interleaved with execution of work tasks. The reporting tasks update shared memory 925 with the current status of the particular worker thread 1005. In one embodiment, the reporting tasks are event based. An event based reporting task updates shared memory 925 in response to a work event that has created new thread status information 940. Event based reporting tasks save time and processing cycles that may otherwise be wasted pulling each worker thread 1005 for thread status information 940 that may or may not yet exist.

Upon creation/instantiation, a new worker thread 1005 is placed into thread pool 1010 as an idle worker thread 1005 available to be assigned a task (e.g., THREAD(1)). In one embodiment, thread manager 1015 assigns new tasks to each worker thread 1005 as work requests 935 arrive. Once assigned a task, the particular worker thread 1005 is removed from the thread pool 1010, signifying that it is currently busy and not available to perform other tasks. Thread manager 1015 also controls whether or not to delete any of worker threads 1005 (e.g., to shrink thread pool 1010). In response to deletion of one of worker threads 1005, the designated worker thread 1005 may clean shared memory 925 of any thread status information 940 corresponding to the designated worker thread 1005 just prior to its deletion. Alternatively, thread manager 1015 may clean shared memory 925 of the corresponding thread status information 940 after the designated worker thread 1005 has been deleted.

In one embodiment, shared memory 925 includes reporting slots S1-SN. Each reporting slot may be registered by a worker thread 1005 and used by the particular worker thread 1005 to store its thread status information 940. Upon deletion of a particular worker thread 1005, its corresponding reporting slot may be cleaned and recycled for use by another worker thread 1005.

Worker threads 1005 (and in some embodiments thread manager 1015 as well) access shared memory 925 via shared memory API 1020. In one embodiment, shared memory API 1020 abstracts access to shared memory 925 through use of function calls. Each worker thread 1005 that wishes to report thread status information 940 into shared memory 925 makes a "call" to one or more functions published internally to worker nodes 915 by shared memory APIs 1020. Worker threads 1005 then pass thread status information 940 to the called function. In turn, the called function copies thread status information 940 into an appropriate reporting slot S1-SN.

In one embodiment, monitoring console 910 transmits status queries to network interface 1003 to request thread status information 940, or a portion thereof. Monitoring console 910 can be implemented using the Microsoft Management Console ("MMC"), while network interface 1003 may be implemented with a WebService based Start Service. In one embodiment, the status queries are conveyed to network interface 1003 using a message based protocol, such as Simple Object Access Protocol ("SOAP") employing extensible markup language ("XML") syntax to send text commands over the HyperText Transport Protocol ("HTTP"). The status query may be transmitted to AS instance 905 automatically on a periodic basis, in response to a specified event, or in response to a screen refresh request by an IT technician.

Upon receipt, the status query is passed to a monitoring API 1040. Monitoring API 1040 accesses the requested portions of shared memory 925 via its own copy of shared memory API 1020. Once monitoring API 1040 retrieves the requested portions of thread status information 940 from shared memory 925, thread status information 940 is conveyed to monitoring console 910. In one embodiment, XML syntax is used to convey thread status information 940 to monitoring console 910.

Monitoring console 910 may further format the received thread status information 940 and render it to a screen for review by an IT technician. Monitoring console 910 may display thread status information 940 received from a number of AS instances 905 to monitor an entire cluster of AS instances 905. Monitoring console 910 may further optionally generate log files to maintain long-term status reports on each AS instance 905 being monitored.

In addition to issuing status requests, monitoring console 910 may negotiate a reporting contract with network interface 1003 to serve up thread status information 940 on a regular or periodic basis, without need of status requests. As such, network interface 1003 may be capable of pushing thread status information 940 to monitoring console 910, as well as, monitoring console 910 pulling thread status information 940 from network interface 1003.

Figure 11:
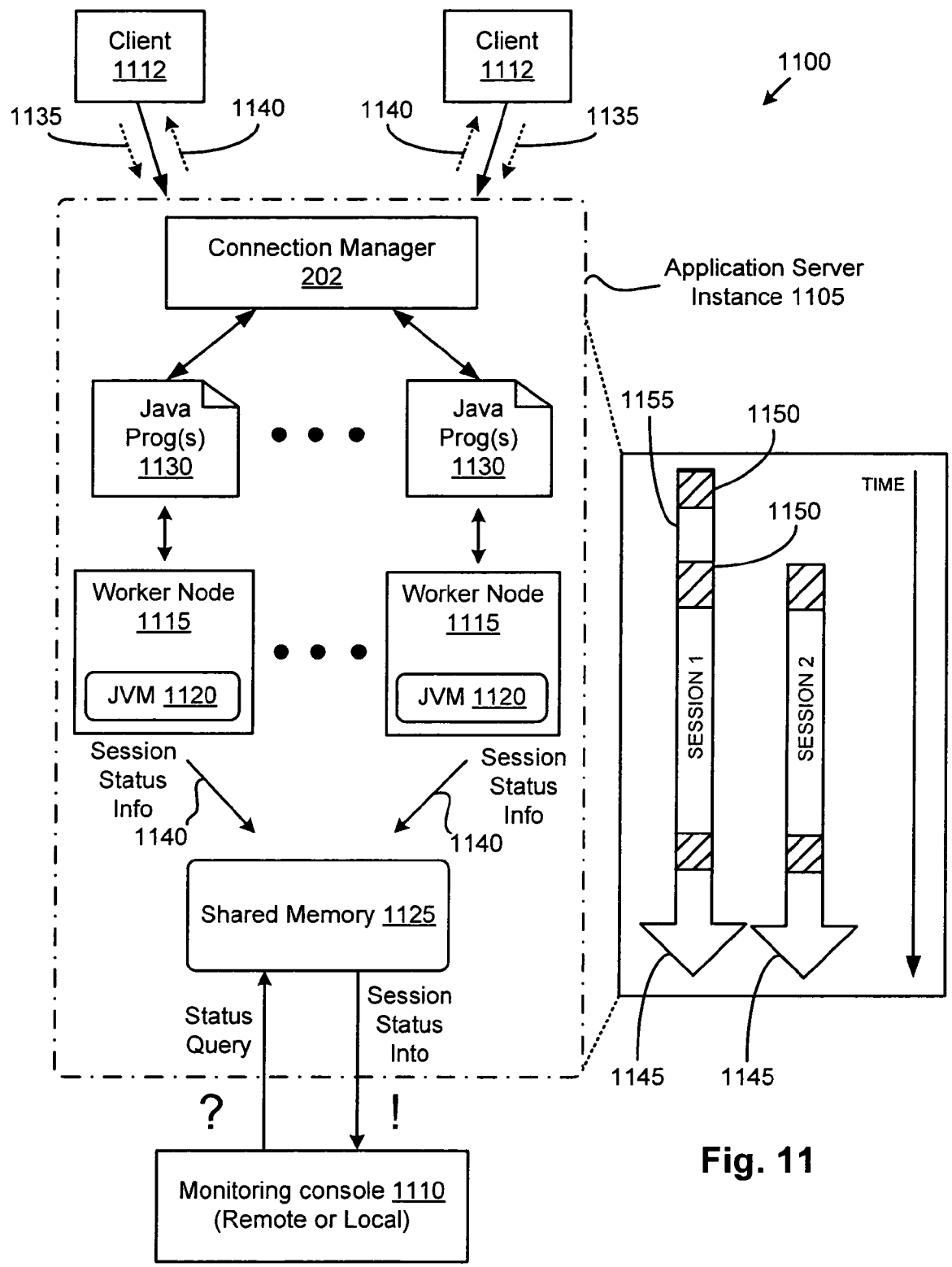
FIG. 11 is a block diagram illustrating a software system for monitoring client sessions within multiple Java virtual machines of an application server instance, in accordance with an embodiment of the invention.

In an embodiment, session monitoring can also be implemented using shared, memory. FIG. 11 is a block diagram illustrating a software system 1100 for monitoring sessions between clients 1112 and worker nodes 1115, in accordance with an embodiment of the invention. The illustrated embodiment of software system 1100 includes AS instance 1105 and a monitoring console 1110. The illustrated embodiment of AS instance 1105 includes one or more worker nodes 1115 each including a JVM 1120, and shared memory 1125. Java worker nodes 1115 provide the runtime environment for JVMs 1120, which in turn interpret/execute Java programs 1130.

Collectively, Java programs 1130 may provide the logic for implementing various sub-layers (e.g., business layer, integration layer, presentation layer, etc.) of AS instance 1105. In one embodiment, AS instance 1105 is a web application server, such as Web AS by SAP, .NET by Microsoft, or the like. In one embodiment, AS instance 1105 represents a Java 2 Platform, Enterprise Edition ("J2EE") instance for providing enterprise software functionality. It should be appreciated that various components of AS instance 1105 have been excluded from FIG. 11 for the sake of clarity and so as not to obscure the invention. Although FIG. 11 illustrates three worker nodes 1115 within AS instance 1105, more or less worker nodes 1115 may be established within AS instance 1105.

During operation, work requests 1135 may be received at AS instance 1105 and assigned to any of worker nodes 1115 for servicing. JVMs 1120 within each worker node 1115 may execute Java programs 1130 containing logic for servicing the received work requests 1135. Each work request 1135 may require performing one or more tasks (e.g., retrieve a name and address from a database) which may also include one or more subtasks (e.g., fetch data from database, render data for output, clean memory). To perform multiple tasks in parallel, each JVM 1120 may maintain a thread pool having a number of available worker threads to perform the tasks. While performing these tasks and subtasks, each of the worker threads is capable of reporting session status information 1140 into shared memory 1125.

Once session status information 1140 is reported into shared memory 1125, monitoring console 1110 can query shared monitoring memory 1125 to display session status information 1140 for review by an Information Technology ("IT") technician. Monitoring console 1110 may be located locally on the same hardware machine executing AS instance 1105, or advantageously, executed on a remote machine couple to a network. Monitoring console 1110 may further monitor an entire cluster of AS instances 1105, all from a single remote machine. Using monitoring console 1110, the IT technician can remotely monitor the status of sessions in real-time to ensure AS instance 1105 remains in a healthful state. Shared memory 1125 working in concert with monitoring console 1110, enables the IT technician to make informed decisions when taking preventative and/or remedial action to effectively maintain and manage an enterprise system.

5.0 Additional Comments

The architectures and methodologies discussed above may be implemented with various types of computing systems such as an application server that includes a Java 2 Platform, Enterprise Edition ("J2EE") server that supports Enterprise JavaBean™ ("EJB™") components and EJB containers (at the business layer) and/or Servlets and Java Server Pages ("JSP") (at the presentation layer). Of course, other embodiments may be implemented in the context of various different software platforms including, by way of example, Microsoft .NET, Windows/NT, Microsoft Transaction Server (MTS), the Advanced Business Application Programming ("ABAP") platforms developed by SAP AG and comparable platforms.

An article of manufacture may be used to store program code. An article of manufacture that stores program code may be embodied as, but is not limited to, one or more memories (e.g., one or more flash memories, random access memories (static, dynamic or other)), optical disks, compact disks-read only memory (CD-ROMs), digital versatile/video disks (DVD ROMs), erasable programmable read-only memory (EPROMs), electrically erasable programmable read-only memory (EEPROMs), magnetic or optical cards or other type of computer-readable media suitable for storing electronic instructions.

An article of manufacture may be used to store program code. An article of manufacture that stores program code may be embodied as, but is not limited to, one or more memories (e.g., one or more flash memories, random access memories (static, dynamic or other)), optical disks, compact disks-read only memory (CD-ROMs), digital versatile/video disks (DVD ROMs), erasable programmable read-only memory (EPROMs), electrically erasable programmable read-only memory (EEPROMs), magnetic or optical cards or other type of machine-readable media suitable for storing electronic instructions. Program code may also be downloaded from a remote computer (e.g., a server) to a requesting computer (e.g., a client) by way of data signals embodied in a propagation medium (e.g., via a communication link (e.g., a network connection)).

Figure 12:
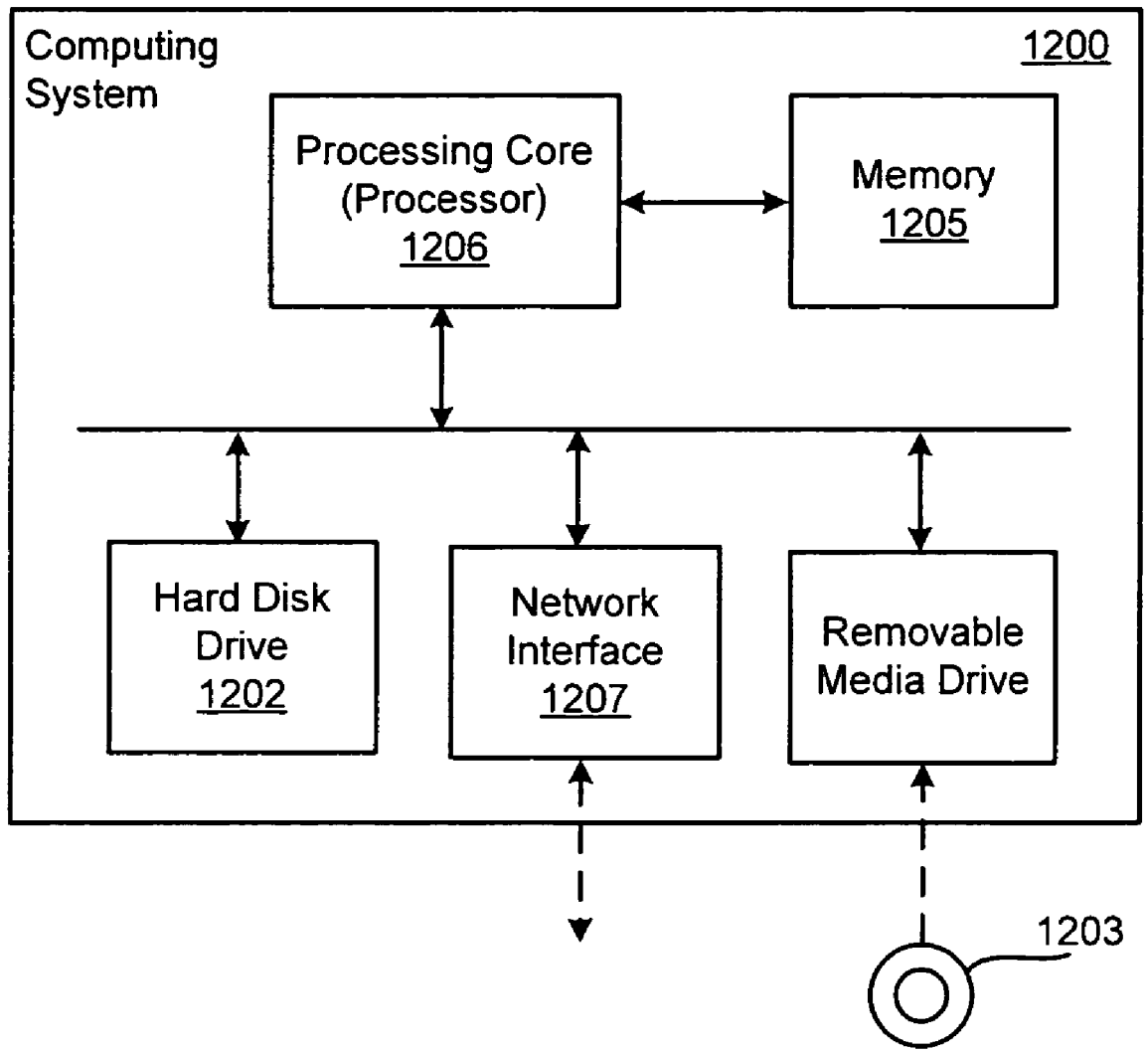
FIG. 12 shows a depiction of a computing system.

FIG. 12 is a block diagram of a computing system 1200 that can execute program code stored by an article of manufacture. It is important to recognize that the computing system block diagram of FIG. 12 is just one of various computing system architectures. The applicable article of manufacture may include one or more fixed components (such as a hard disk drive 1202 or memory 1205) and/or various movable components such as a CD ROM 1203, a compact disc, a magnetic tape, etc. In order to execute the program code, typically instructions of the program code are loaded into the Random Access Memory (RAM) 1205; and, the processing core 1206 then executes the instructions. The processing core may include one or more processors and a memory controller function. A virtual machine or "interpreter" (e.g., a Java Virtual Machine) may run on top of the processing core (architecturally speaking) in order to convert abstract code (e.g., Java bytecode) into instructions that are understandable to the specific processor(s) of the processing core 1206.

It is believed that processes taught by the discussion above can be practiced within various software environments such as, for example, object-oriented and non-object-oriented programming environments, Java based environments (such as a Java 2 Enterprise Edition (J2EE) environment or environments defined by other releases of the Java standard), or other environments (e.g., a .NET environment, a Windows/NT environment each provided by Microsoft Corporation).

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative rather than a restrictive sense.

What is claimed is:

1. A system comprising:
   a processor configured to execute instructions for an application server;
   a connection manager configured to receive a request from a client, the connection manager including an integrated dispatcher, the connection manager to select which one of at least two heterogeneous application server software suites to process the request and to provide the request to the selected software suite, the application server software suites including:
   a first standards-based application server software suite coupled with the connection manager, the first application server software suite having a first plurality of worker nodes each configured to receive and process the request from the client, the integrated dispatcher to dispatch requests to the first plurality of worker nodes, and
   a second proprietary application server software suite coupled with the connection manager, the second application server software suite having a second plurality of worker nodes each configured to receive and process the request from the client;
   a shared memory coupled with the processor, the shared memory including at least a first shared memory region to support data transfers to and from the first application server software suite and to and from the second application server software suite, the first plurality of worker nodes and the second plurality of worker nodes having access to the first shared memory region to receive and store content; and
   a set of request notification queues, the set including a request notification queue for each worker node of the first plurality of worker nodes, wherein the set of request notification queues and the shared memory provide for transfer of a session from a first worker node to a second worker node upon a failure of the first worker node prior to servicing a request notification.

2. The system of claim 1, wherein the shared memory includes a second shared memory region to store session objects having session state information for the first plurality of worker nodes of the first application server software suite.

3. The system of claim 2, further comprising a third shared memory region to store session state information regarding the routing of requests, the third shared memory being a session table shared memory, the session state information including a value representing a number of outstanding active requests for a session for which responses have not been generated by worker nodes.

4. The system of claim 3, wherein the dispatcher is to place information identifying a selected worker node and identifying a request notification queue for the selected worker node into a session table entry of the session table shared memory.

5. The system of claim 2, wherein the second shared memory region is a closure based shared memory.

6. The system of claim 5, wherein the first plurality of worker nodes includes a plurality of virtual machines, the plurality of virtual machines to share memory in the second shared memory region, the second shared memory region being limited to shareable closures.

7. The system of claim 6, wherein a number of application threads running on each of the one or more virtual machines is limited to a threshold value, and wherein a number of application threads per CPU (central processing unit) of the system is limited to a fixed number that is based at least in part on an input/output ratio of an application.

8. The system of claim 5, wherein the shared memory further includes a cache region to be shared by the first plurality of worker nodes.

9. The system of claim 8, wherein the cache region to be shared by the first plurality of worker nodes is a region of the shared closure based shared memory.

10. The system of claim 5, wherein the first shared memory region is a connection oriented shared memory.

11. The system of claim 10, wherein the connection oriented shared memory is based, at least in part, on a fast channel architecture.

12. The system of claim 11, wherein the connection oriented shared memory is a request/response shared memory, the request response shared memory coupled with the connection manager, the first application server software suite and the second application server software suite.

13. The system of claim 1, wherein the shared memory is to store shared class loaders, the shared class loaders accessible by the first plurality of worker nodes, wherein the shared class loaders are not modified after the shared class loaders are created.

14. The system of claim 1, wherein the shared memory is to store at least one of:
 thread status information corresponding to a selected worker node of the first plurality of worker nodes; and
 session status information corresponding to the selected worker node of the first plurality of worker nodes.

15. The system of claim 14, further comprising:
 a monitoring console configured to obtain at least one of session status information and thread status information from the shared memory.

16. The system of claim 1, wherein any of a plurality of protocol handlers may be plugged into the connection manager to support any of a plurality of protocols.

17. The system of claim 1, wherein the first application server software suite is compatible with J2EE™ (Java™ 2 Platform, Enterprise Edition).

18. A method comprising:
 receiving a request from a client at a connection manager, the connection manager including an integrated first dispatcher;
 selecting one of a plurality of heterogeneous application software suites for execution by a processor to receive the request, the application server software suites including:
 a first standards-based application server software suite coupled with the connection manager, the first application server software suite having a first plurality of worker nodes each configured to receive and process the request from the client, wherein the integrated first dispatcher is configured to operate as a dispatcher for the first plurality of worker nodes, and
 a second proprietary application server software suite coupled with the connection manager, the second application server software suite having a second plurality of worker nodes each configured to receive and process the request from the client;
 transferring the request from the connection manager to a dispatcher associated with the selected application software suites;
 selecting a first worker node of the selected application software suite to receive the request;
 dispatching the request from the dispatcher associated with the selected application software suite to the first worker node;
 storing a notification for the request in a first request notification queue of a set of request notification queues if the first worker node is a worker node of the first plurality of worker nodes, the set including a request notification queue for each worker node of the first plurality of worker nodes, wherein the set of request notification queues and the shared memory provide for transfer of a session from the first worker node to a second worker node upon a failure of the first worker node prior to servicing a request notification; and
 receiving data for the request from the dispatcher at the first worker node via a shared memory, the shared memory including a first shared memory region to support data transfers to and from the first application server software suite and to and from the second application software suite, the first and second plurality of worker nodes having access to the first shared memory region to receive and store content, the first worker node to process the request.

19. The method of claim 18, wherein the first memory region is a connection oriented shared memory, and wherein dispatching the request to the first worker node comprises:
 reading the request data from a network layer interface into the connection oriented shared memory.

20. The method of claim 18, wherein the shared memory further includes a second shared memory region to store session objects having session state information for the first plurality of worker nodes, the second shared memory region being a closure based shared memory, further comprising:
 providing a cache from the closure based shared memory, wherein the cache is visible to the first plurality of worker nodes.

21. The method of claim 18, further comprising:
 generating status information for a thread assigned to the selected first worker node; and
 storing the status information in shared memory.

22. The method of claim 18, further comprising:
 generating session context information for a session between the client providing the request and the first worker node; and
 storing the session status information in the shared memory.

23. An article of manufacturer comprising computer-readable medium providing instructions that, when executed by a processor, cause the processor to:
 receive a request from a client at a connection manager, the connection manager including an integrated first dispatcher;
 select one of a plurality of heterogeneous application software suites for execution by a processor to receive the request, the application server software suites including:
 a first standards-based application server software suite coupled with the connection manager, the first application server software suite having a first plurality of worker nodes each capable configured to receive and process the request from the client, wherein the integrated first dispatcher is configured to operate as a dispatcher for the first plurality of worker nodes, and
 a second proprietary application server software suite coupled with the connection manager, the second application server software suite having a second plurality of worker nodes each capable configured to receive and process the request from the client;
 transfer the request from the connection manager to a dispatcher associated with the selected application software suite;

select a first worker node of the selected application software suite to receive the request;
dispatching the request from the dispatcher for the selected application software suite to the first worker node;
store a notification for the request in a first request notification queue of a set of request notification queues if the first worker node is a worker node of the first plurality of worker node, the set including a request notification queue for each worker node of the first plurality of worker nodes, wherein the set of request notification queues and the shared memory provide for transfer of a session from the first worker node to a second worker node of the first plurality of worker nodes upon a failure of the first worker node prior to servicing a request notification; and
receive data for the request from the dispatcher for the selected application software suite at the first worker node via a shared memory, the shared memory including a first shared memory region to support data transfers to and from the first application server software suite and to and from the second application software suite, the first plurality of worker nodes and the second plurality of worker nodes having access to the first shared memory region to receive and store content, the first worker node to process the request.

24. The article of manufacture of claim 23, wherein the shared memory further includes a second shared memory region to store session objects having session state information for the first plurality of worker nodes, the second shared memory region being a closure based shared memory, and wherein the computer-readable medium provides further instructions that, when executed by the processor, cause the processor to:
provide a cache from the closure based shared memory, wherein the cache is visible to the first plurality of worker nodes.

25. The article of manufacture of claim 23, wherein the computer-readable medium provides further instructions that, when executed by the processor, cause the processor to:
generate status information for a thread assigned to the selected first worker node; and
store the status information in the shared memory.

* * * * *